US008965546B2

(12) United States Patent
Visser et al.

(10) Patent No.: US 8,965,546 B2
(45) Date of Patent: Feb. 24, 2015

(54) SYSTEMS, METHODS, AND APPARATUS FOR ENHANCED ACOUSTIC IMAGING

(75) Inventors: Erik Visser, San Diego, CA (US); Pei Xiang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 753 days.

(21) Appl. No.: 13/190,464

(22) Filed: Jul. 25, 2011

(65) Prior Publication Data

US 2012/0020480 A1 Jan. 26, 2012

Related U.S. Application Data

(60) Provisional application No. 61/367,840, filed on Jul. 26, 2010, provisional application No. 61/483,209, filed on May 6, 2011.

(51) Int. Cl.

*G06F 17/00* (2006.01)
*H04R 3/12* (2006.01)
*H04S 7/00* (2006.01)

(52) U.S. Cl.

CPC ............ *H04R 3/12* (2013.01); *H04R 2201/405* (2013.01); *H04R 2430/20* (2013.01); *H04R 2499/11* (2013.01); *H04S 7/303* (2013.01)

USPC ............................................ 700/94; 381/182

(58) Field of Classification Search

USPC ............................................................ 700/94

See application file for complete search history.

(56) References Cited

U.S. PATENT DOCUMENTS

| | | | |
|---|---|---|---|
| 3,476,880 | A | 11/1969 | Flanagan |
| 5,930,373 | A | 7/1999 | Shashoua et al. |
| 7,054,451 | B2 | 5/2006 | Janse et al. |
| 7,272,073 | B2 | 9/2007 | Pellegrini et al. |
| 2004/0223620 | A1 | 11/2004 | Horbach et al. |
| 2006/0159283 | A1 | 7/2006 | Mathew et al. |
| 2008/0025534 | A1 | 1/2008 | Kuhn et al. |
| 2008/0056517 | A1 | 3/2008 | Algazi et al. |
| 2008/0152175 | A1 | 6/2008 | Kim et al. |
| 2008/0181416 | A1 | 7/2008 | Jung |
| 2008/0304677 | A1 | 12/2008 | Abolfathi et al. |
| 2009/0060236 | A1 | 3/2009 | Johnston et al. |
| 2009/0147963 | A1 | 6/2009 | Smith |
| 2010/0124150 | A1 | 5/2010 | Kablotsky |
| 2010/0158272 | A1 | 6/2010 | Vickers |

FOREIGN PATENT DOCUMENTS

| | | | |
|---|---|---|---|
| EP | 1838135 | A1 | 9/2007 |
| EP | 2109328 | A1 | 10/2009 |
| GB | 2352379 | A | 1/2001 |
| JP | 2005064746 | A | 3/2005 |
| JP | 2006222670 | A | 8/2006 |

(Continued)

OTHER PUBLICATIONS

International Preliminary Report on Patentability—PCT/US2011/045418, The International Bureau of WIPO—Geneva, Switzerland—Oct. 24, 2012.

(Continued)

*Primary Examiner* — Joseph Saunders, Jr.

(74) *Attorney, Agent, or Firm* — Austin Rapp & Hardman

(57) ABSTRACT

Methods, systems, and apparatus for using a psychoacoustic-bass-enhanced signal to drive an array of loudspeakers are disclosed.

49 Claims, 38 Drawing Sheets

(56) References Cited

FOREIGN PATENT DOCUMENTS

| | | | |
|---|---|---|---|
| JP | 2006319390 | A | 11/2006 |
| JP | 2006352570 | A | 12/2006 |
| JP | 2007068060 | A | 3/2007 |
| JP | 2008134421 | A | 6/2008 |
| JP | 2008227804 | A | 9/2008 |
| KR | 20090058224 | A | 6/2009 |
| WO | WO2009056508 | A1 | 5/2009 |
| WO | WO2009124618 | A1 | 10/2009 |
| WO | WO-2009124772 | A1 | 10/2009 |

OTHER PUBLICATIONS

Furi Andi Karnapi et al: "Method to enhance Low Frequency Perception from Parametric Array Loudspeaker", Audio Engineering Society Convention Paper, New York, NY, US, No. 5636, May 10, 2002, XP002531151.

International Search Report and Written Opinion—PCT/US2011/045418, International Search Authority—European Patent Office—Sep. 20, 2011.

Aarts, R.M. The application of illusions and psychoacoustics to small loudspeaker configurations. Illusions in sound—22nd AES UK conference 2007, pp. 7-1 to 7-7.

Bai, M.R. et al. Synthesis and Implementation of Virtual Bass System with a Phase-Vocoder Approach. J. Audio. Eng. Soc., vol. 54, No. 11, Nov. 2006, pp. 1077-1091.

Ben-Tzur, D. et al. The Effect of the MaxxBass Psychoacoustic Bass Enhancement System on Loudspeaker Design. 10 pp. Available online on Jul. 27, 2011 at www.maxx.com/objects/PDF/MaxxBassAESPaper.pdf.

Beracoechea, J.A. et al. On Building Immersive Audio Applications Using Robust Adaptive Beamforming and Joint Audio-Video Source Localization. EURASIP J. on Applied Signal Processing, vol. 2006, Article ID 40960, pp. 1-12.

Berkhout, A.J. et al. Acoustic Control by Wave Field Synthesis. J. Acoust. Soc. Am., vol. 93, May 1993, pp. 2764-2778.

Buchner, H. et al. Wave-Domain Adaptive Filtering for Acoustic Human-Machine Interfaces based on Wavefield Analysis and Synthesis. Sep. 9, 2004, 34 pp. Available online Jul. 27, 2011 at www.buchner-net.com/buchner_eusipco04_WDAF_web.pdf.

Chiu, L.K. et al. Psychoacoustic Bass Enhancement System on Reconfigurable Analog Signal Processor. 52nd IEEE Int'l Midwest Symp. on Circuits and Systems (MWSCAS '09), 2009, pp. 164-167.

Corteel, E. et al. Compact loudspeaker array for enhanced stereophonic sound reproduction. Proc. 2nd Int'l Symp. on Ambisonics and Spherical Acoustics, May 6-7, 2010, Paris, FR. 2 pp.

Cox, R. M. et al. Robust Adaptive Beamforming. IEEE Trans. Acoust., Speech, Signal Processing, vol. 35, pp. 1365-1376, Oct. 1987.

Guldenschuh, M. et al. Transaural stereo in a beamforming approach. Proc. 12th Int'l Conf. on Digital Audio Effects (DAFx-09), Como, IT, Sep. 1-4, 2009. pp. DAFX-1--DAFX-6.

Haapsaari, T. Two-Way Acoustic Window using Wave Field Synthesis. M.Sc. thesis, Helsinki Univ. of Technology, FI, 2007. 83 pp.

Larsen, E. et al. Reproducing Low-Pitched Signals through Small Loudspeakers. J. Audio. Eng. Soc., vol. 50, No. 3, Mar. 2002, pp. 147-164.

Mabande, E. et al. Towards superdirective beamforming with loudspeaker arrays. Conf. Rec. International Congress on Acoustics, Madrid, Spain, Sep. 2007.

Meyer Sound Laboratories. DSP Beam Steering with Modern Line Arrays. Technical Report, 2002. 4 pp. Available online on Jul. 27, 2011 at http://www.meyersound.com/pdf/support/papers/beam_steering.pdf.

$$\mathbf{W} = \frac{(\Gamma_{\mathbf{VV}} + \mu\mathbf{I})^{-1}\mathbf{d}}{\mathbf{d}^H(\Gamma_{\mathbf{VV}} + \mu\mathbf{I})^{-1}\mathbf{d}} \qquad \text{Eq. (1)}$$

$$\mathbf{d}^T = [1, \exp(-j\Omega f_s c^{-1} l\cos(\theta_0)), \exp(-j\Omega f_s c^{-1} 2l\cos(\theta_0)), \ldots, \exp(-j\Omega f_s c^{-1}(N-1)l\cos(\theta_0))] \qquad \text{Eq. (2)}$$

FIG. 2

$$\Gamma_{V_nV_m} = \frac{\mathrm{sinc}\{\frac{\Omega f_s l_{nm}}{c}\}}{1 + \frac{\sigma^2}{\Phi_{VV}}} \forall n \neq m \qquad \text{Eq. (3)}$$

$$p(r,\theta) \approx \frac{e^{-jkr_0}}{r}\sum_{n=0}^{N-1} A_n e^{jnkd\cos\theta}$$
Eq. (4)

$$p(r,\theta) = \frac{e^{-jkr_0}}{r}\sum_{n=0}^{N-1} |A_n| e^{jn(kd\cos\theta+\alpha)}$$
Eq. (5)

$$\theta_{design} = \arccos\frac{-\alpha}{kd}$$
Eq. (6)

FIG. 7A
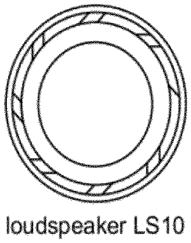
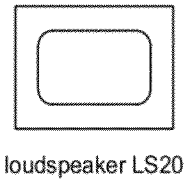
FIG. 7B
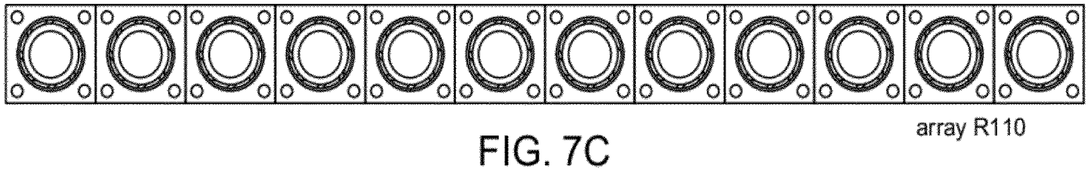
FIG. 7C
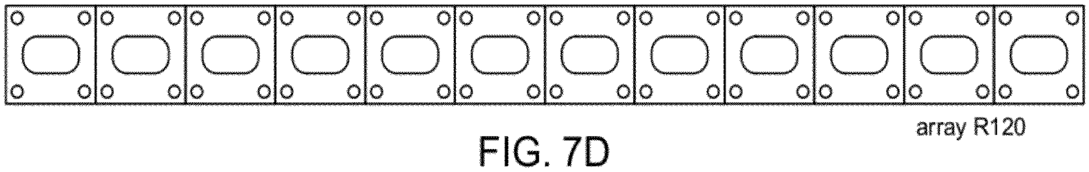
FIG. 7D

FIG. 13A
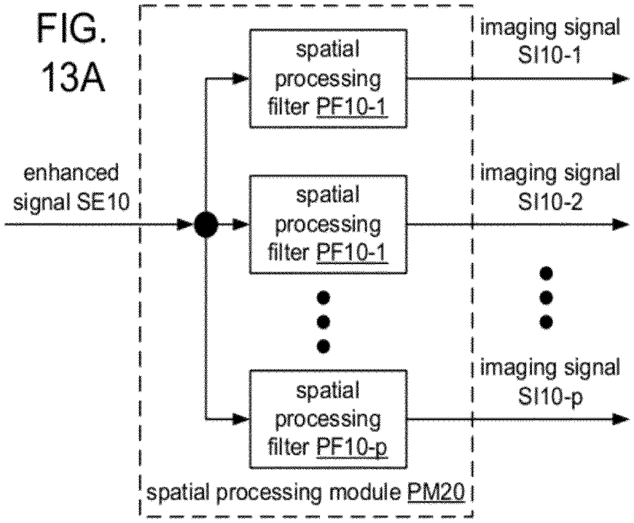
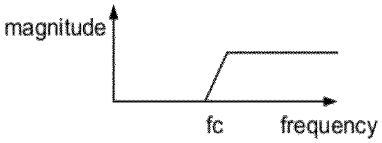
FIG. 13C
FIG. 13B
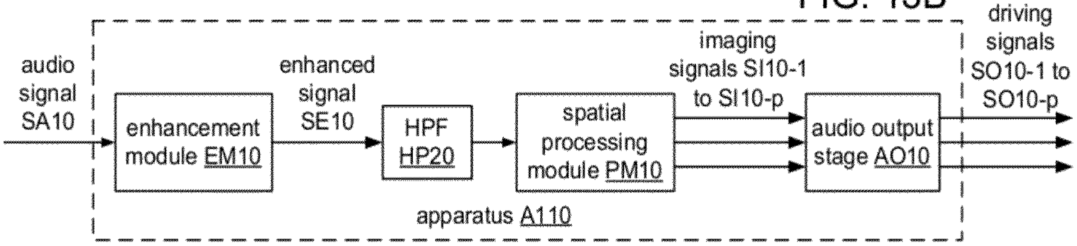

SYSTEMS, METHODS, AND APPARATUS FOR ENHANCED ACOUSTIC IMAGING

CLAIM OF PRIORITY UNDER 35 U.S.C. §119

The present Application for Patent claims priority to Provisional Application No. 61/367,840, entitled "SYSTEMS, METHODS, AND APPARATUS FOR BASS ENHANCED SPEAKER ARRAY SYSTEMS," filed Jul. 26, 2010, and assigned to the assignee hereof. The present Application for Patent also claims priority to Provisional Application No. 61/483,209, entitled "DISTRIBUTED AND/OR PSYCHOACOUSTICALLY ENHANCED LOUDSPEAKER ARRAY SYSTEMS," filed May 6, 2011, and assigned to the assignee hereof.

BACKGROUND

1. Field

This disclosure relates to audio signal processing.

2. Background

Beamforming is a signal processing technique originally used in sensor arrays (e.g., microphone arrays) for directional signal transmission or reception. This spatial selectivity is achieved by using fixed or adaptive receive/transmit beampatterns. Examples of fixed beamformers include the delay-and-sum beamformer (DSB) and the superdirective beamformer, each of which is a special case of the minimum variance distortionless response (MVDR) beamformer.

Due to the reciprocity principle of acoustics, microphone beamformer theories that are used to create sound pick-up patterns may be applied to speaker arrays instead to achieve sound projection patterns. For example, beamforming theories may be applied to an array of speakers to steer a sound projection to a desired direction in space.

SUMMARY

A method of audio signal processing according to a general configuration includes spatially processing a first audio signal to generate a first plurality M of imaging signals. This method includes, for each of the first plurality M of imaging signals, applying a corresponding one of a first plurality M of driving signals to a corresponding one of a first plurality M of loudspeakers of an array, wherein the driving signal is based on the imaging signal. This method includes harmonically extending a second audio signal that includes energy in a first frequency range to produce an extended signal that includes harmonics, in a second frequency range that is higher than the first frequency range, of said energy of the second audio signal in the first frequency range; and spatially processing an enhanced signal that is based on the extended signal to generate a second plurality N of imaging signals. This method includes, for each of the second plurality N of imaging signals, applying a corresponding one of a second plurality N of driving signals to a corresponding one of a second plurality N of loudspeakers of the array, wherein the driving signal is based on the imaging signal. Computer-readable storage media (e.g., non-transitory media) having tangible features that cause a machine reading the features to perform such a method are also disclosed.

An apparatus for audio signal processing according to a general configuration includes means for spatially processing a first audio signal to generate a first plurality M of imaging signals; and means for applying, for each of the first plurality M of imaging signals, a corresponding one of a first plurality M of driving signals to a corresponding one of a first plurality M of loudspeakers of an array, wherein the driving signal is based on the imaging signal. This apparatus includes means for harmonically extending a second audio signal that includes energy in a first frequency range to produce an extended signal that includes harmonics, in a second frequency range that is higher than the first frequency range, of said energy of the second audio signal in the first frequency range; and means for spatially processing an enhanced signal that is based on the extended signal to generate a second plurality N of imaging signals. This apparatus includes means for applying, for each of the second plurality N of imaging signals, a corresponding one of a second plurality N of driving signals to a corresponding one of a second plurality N of loudspeakers of the array, wherein the driving signal is based on the imaging signal.

An apparatus for audio signal processing according to a general configuration includes a first spatial processing module configured to spatially process a first audio signal to generate a first plurality M of imaging signals, and an audio output stage configured to apply, for each of the first plurality M of imaging signals, a corresponding one of a first plurality M of driving signals to a corresponding one of a first plurality M of loudspeakers of an array, wherein the driving signal is based on the imaging signal. This apparatus includes a harmonic extension module configured to harmonically extend a second audio signal that includes energy in a first frequency range to produce an extended signal that includes harmonics, in a second frequency range that is higher than the first frequency range, of said energy of the second audio signal in the first frequency range, and a second spatial processing module configured to spatially process an enhanced signal that is based on the extended signal to generate a second plurality N of imaging signals. In this apparatus, the audio output stage is configured to apply, for each of the second plurality N of imaging signals, a corresponding one of a second plurality N of driving signals to a corresponding one of a second plurality N of loudspeakers of the array, wherein the driving signal is based on the imaging signal.

BRIEF DESCRIPTION OF THE DRAWINGS

FIG. 2 shows an example of beamformer theory for an MVDR beamformer.

FIG. 7A shows an example of a cone-type loudspeaker.

FIG. 7B shows an example of a rectangular loudspeaker.

FIG. 7C shows an example of an array of twelve loudspeakers.

FIG. 7D shows an example of an array of twelve loudspeakers.

FIG. 13A shows a block diagram of an implementation PM20 of spatial processing module PM10.

FIG. 13B shows a block diagram of an implementation A110 of apparatus A100.

FIG. 13C shows an example of the magnitude response of highpass filter HP20.

DETAILED DESCRIPTION

Figure 1:
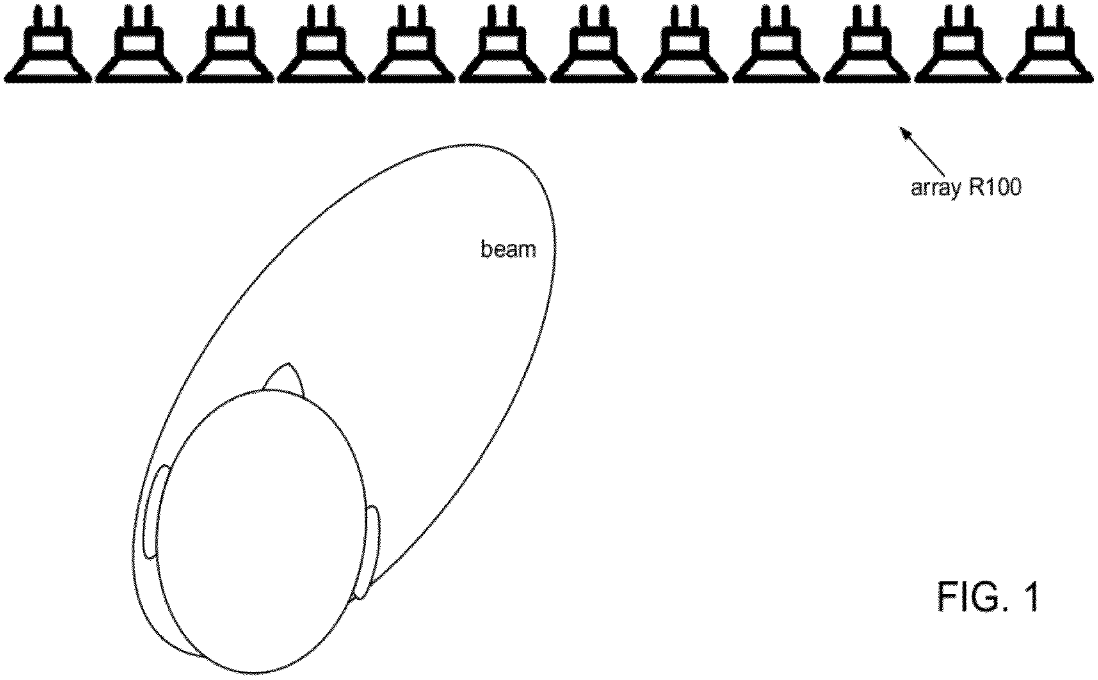
FIG. 1 shows one example of an application of beamforming to a loudspeaker array.

Unless expressly limited by its context, the term "signal" is used herein to indicate any of its ordinary meanings, including a state of a memory location (or set of memory locations) as expressed on a wire, bus, or other transmission medium. Unless expressly limited by its context, the term "generating" is used herein to indicate any of its ordinary meanings, such as computing or otherwise producing. Unless expressly limited by its context, the term "calculating" is used herein to indicate any of its ordinary meanings, such as computing, evaluating, estimating, and/or selecting from a plurality of values. Unless expressly limited by its context, the term "obtaining" is used to indicate any of its ordinary meanings, such as calculating, deriving, receiving (e.g., from an external device), and/or retrieving (e.g., from an array of storage elements). Unless expressly limited by its context, the term "selecting" is used to indicate any of its ordinary meanings, such as identifying, indicating, applying, and/or using at least one, and fewer than all, of a set of two or more. Where the term "comprising" is used in the present description and claims, it does not exclude other elements or operations. The term "based on" (as in "A is based on B") is used to indicate any of its ordinary meanings, including the cases (i) "derived from" (e.g., "B is a precursor of A"), (ii) "based on at least" (e.g., "A is based on at least B") and, if appropriate in the particular context, (iii) "equal to" (e.g., "A is equal to B"). Similarly, the term "in response to" is used to indicate any of its ordinary meanings, including "in response to at least."

References to a "location" of a microphone of a multi-microphone audio sensing device indicate the location of the center of an acoustically sensitive face of the microphone, unless otherwise indicated by the context. The term "channel" is used at times to indicate a signal path and at other times to indicate a signal carried by such a path, according to the particular context. Unless otherwise indicated, the term "series" is used to indicate a sequence of two or more items. The term "logarithm" is used to indicate the base-ten logarithm, although extensions of such an operation to other bases are within the scope of this disclosure. The term "frequency component" is used to indicate one among a set of frequencies or frequency bands of a signal, such as a sample of a frequency domain representation of the signal (e.g., as produced by a fast Fourier transform) or a subband of the signal (e.g., a Bark scale or mel scale subband).

Unless indicated otherwise, any disclosure of an operation of an apparatus having a particular feature is also expressly intended to disclose a method having an analogous feature (and vice versa), and any disclosure of an operation of an apparatus according to a particular configuration is also expressly intended to disclose a method according to an analogous configuration (and vice versa). The term "configuration" may be used in reference to a method, apparatus, and/or system as indicated by its particular context. The terms "method," "process," "procedure," and "technique" are used generically and interchangeably unless otherwise indicated by the particular context. The terms "apparatus" and "device" are also used generically and interchangeably unless otherwise indicated by the particular context. The terms "element" and "module" are typically used to indicate a portion of a greater configuration. Unless expressly limited by its context, the term "system" is used herein to indicate any of its ordinary meanings, including "a group of elements that interact to serve a common purpose." Any incorporation by reference of a portion of a document shall also be understood to incorporate definitions of terms or variables that are referenced within the portion, where such definitions appear elsewhere in the document, as well as any figures referenced in the incorporated portion.

The near-field may be defined as that region of space which is less than one wavelength away from a sound receiver (e.g., a microphone array). Under this definition, the distance to the boundary of the region varies inversely with frequency. At frequencies of two hundred, seven hundred, and two thousand hertz, for example, the distance to a one-wavelength boundary is about 170, forty-nine, and seventeen centimeters, respectively. It may be useful instead to consider the near-field/far-field boundary to be at a particular distance from the microphone array (e.g., fifty centimeters from a microphone of the array or from the centroid of the array, or one meter or 1.5 meters from a microphone of the array or from the centroid of the array).

Beamforming may be used to enhance a user experience by creating an aural image in space, which may be varied over time, or may provide a privacy mode to the user by steering the audio toward a target user. FIG. 1 shows one example of an application of beamforming to a loudspeaker array R100. In this example, the array is driven to create a beam of acoustic energy that is concentrated in the direction of the user and to create a valley in the beam response at other locations. Such an approach may use any method capable of creating constructive interference in a desired direction (e.g., steering a beam in a particular direction) while creating destructive interference in other directions (e.g., explicitly creating a null beam in another direction).

FIG. 2 shows an example of beamformer theory for an MVDR beamformer, which is an example of a superdirective beamformer. The design goal of an MVDR beamformer is to minimize the output signal power with the constraint $\min_W W^H \Phi_{XX} W$ subject to $W^H d=1$, where W denotes the filter coefficient matrix, $\Phi_{XX}$ denotes the normalized cross-power spectral density matrix of the loudspeaker signals, and d denotes the steering vector. Such a beam design is shown in Equation (1) of FIG. 2, where $d^T$ (as expressed in Eq. (2)) is a farfield model for linear arrays and $\Gamma_{V_nV_m}$ (as expressed in Eq. (3)) is a coherence matrix whose diagonal elements are 1. In these equations, $\mu$ denotes a regularization parameter (e.g., a stability factor), $\theta_0$ denotes the beam direction, $f_s$ denotes the sampling rate, $\Omega$ denotes angular frequency of the signal, c denotes the speed of sound, l denotes the distance between the centers of the radiating surfaces of adjacent loudspeakers, $l_{nm}$ denotes the distance between the centers of the radiating surfaces of loudspeakers n and m, $\Phi_{VV}$ denotes the normalized cross-power spectral density matrix of the noise, and $\sigma^2$ denotes transducer noise power.

Figure 3:
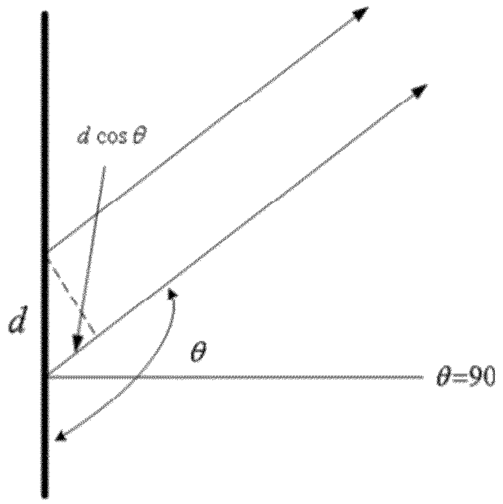
FIG. 3 shows an example of phased array theory.

Other beamformer designs include phased arrays, such as delay-and-sum beamformers (DSBs). The diagram in FIG. 3 illustrates an application of phased array theory, where d indicates the distance between adjacent loudspeakers (i.e., between the centers of the radiating surfaces of each loudspeaker) and $\theta$ indicates the listening angle. Equation (4) of FIG. 3 describes the pressure field p created by the array of N loudspeakers (in the far field), where r is the distance between the listener and the array and k is the wavenumber; Eq. (5) describes the sound field with a phase term $\alpha$ that relates to a time difference between the loudspeakers; and Eq. (6) describes a relation of a design angle $\theta$ to the phase term $\alpha$.

Figure 4:
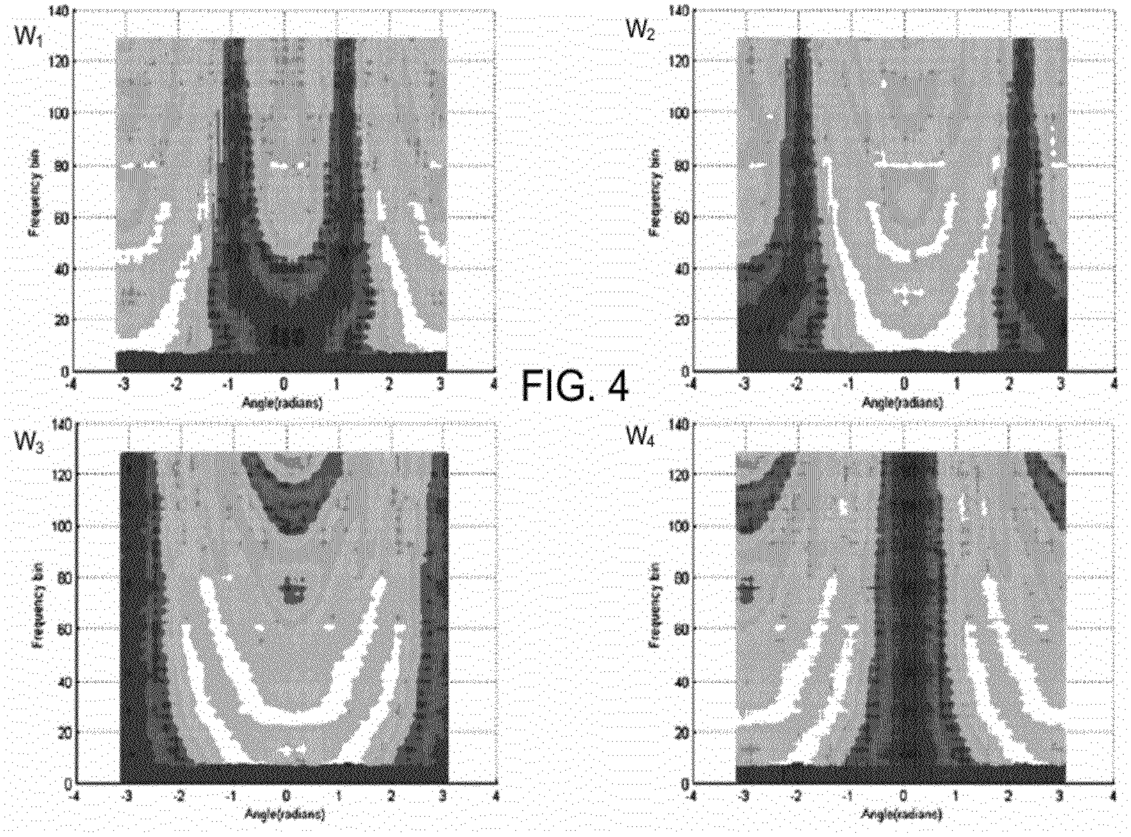
FIG. 4 shows examples of beam patterns for a set of initial conditions for a BSS algorithm.
Figure 5:
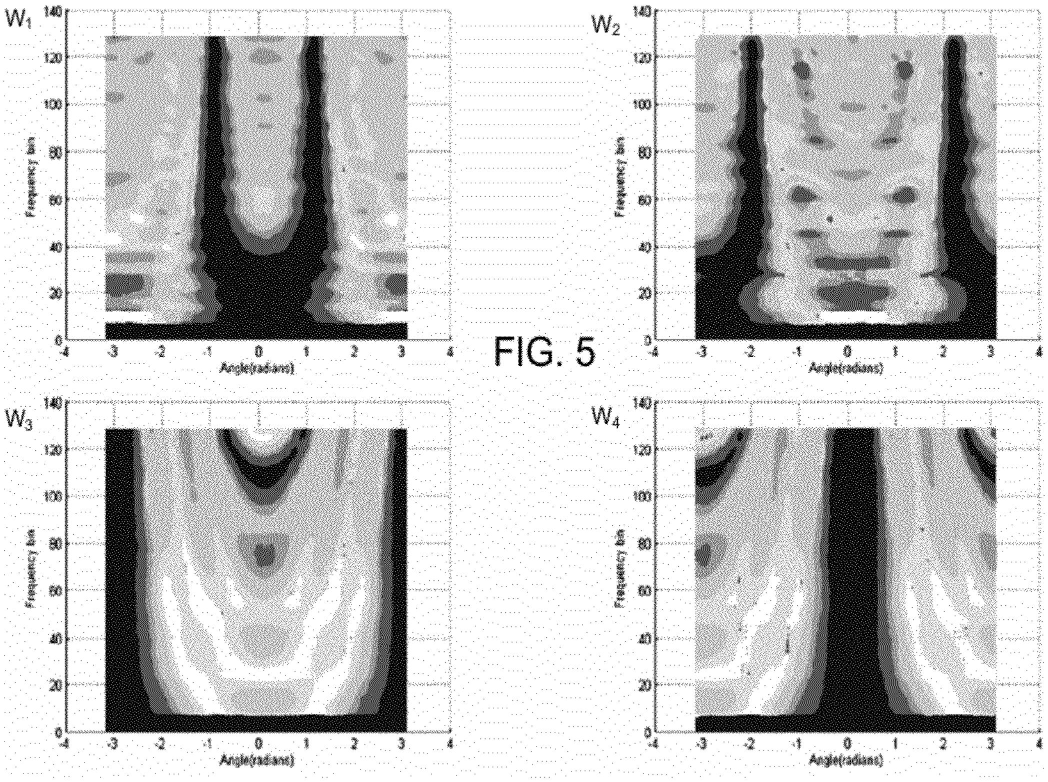
FIG. 5 shows examples of beam patterns generated from those initial conditions using a constrained BSS approach.

Beamforming designs are typically data-independent. Beam generation may also be performed using a blind source separation (BSS) algorithm, which is adaptive (e.g., data-dependent). FIG. 4 shows examples of beam patterns for a set of initial conditions for a BSS algorithm, and FIG. 5 shows examples of beam patterns generated from those initial conditions using a constrained BSS approach. Other acoustic imaging (sound-directing) techniques that may be used in conjunction with the enhancement and/or distributed-array approaches as described herein include binaural enhancements with inverse filter designs, such as inverse head-related transfer functions (HRTF), which may be based on stereo dipole theories.

The ability to produce a quality bass sound from a loudspeaker is a function of the physical speaker size (e.g., cone diameter). In general, a larger loudspeaker reproduces low audio frequencies better than a small loudspeaker. Due to the limits of its physical dimensions, a small loudspeaker cannot move much air to generate low-frequency sound. One approach to solving the problem of low-frequency spatial processing is to supplement an array of small loudspeakers with another array of loudspeakers having larger loudspeaker cones, so that the array with larger loudspeakers handles the low-frequency content. This solution is not practical, however, if the loudspeaker array is to be installed on a portable device such as a laptop, or in other space-limited applications that may not be able to accommodate another array of larger loudspeakers.

Figure 6:
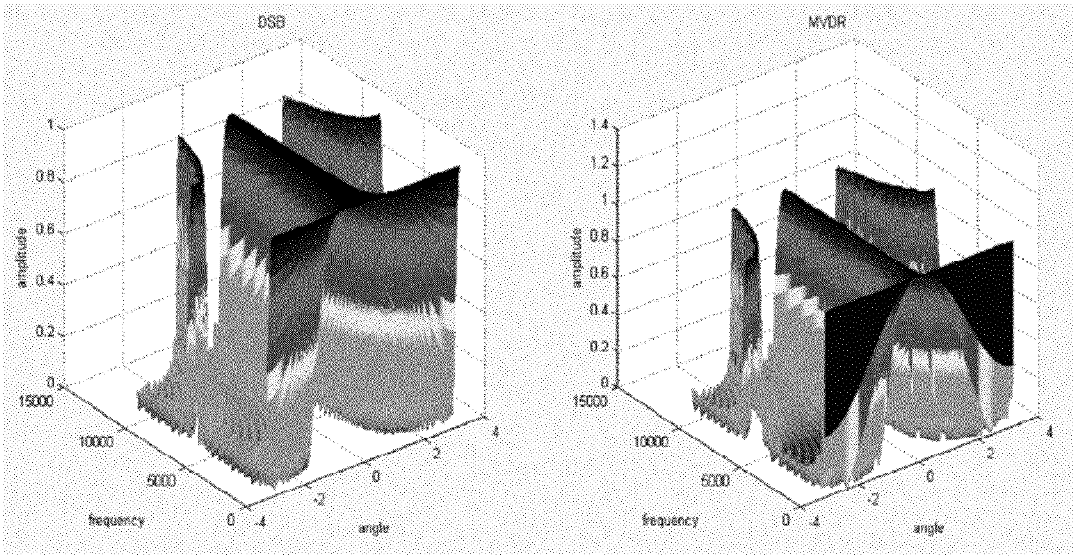
FIG. 6 shows example beam patterns for DSB (left) and MVDR (right) beamformers, designed with a 22-kHz sampling rate and steering direction at zero degrees, on a uniform linear array of twelve loudspeakers.

Even if the loudspeakers of an array are large enough to accommodate the low frequencies, they may be positioned so closely together (e.g., due to form factor constraints) that the ability of the array to direct low-frequency energy differently in different directions is poor. To form a sharp beam at low frequencies is a challenge for beamformers, especially when the loudspeakers are physically located in close proximity to each other. Both DSB and MVDR loudspeaker beamformers have difficulty steering low frequencies. FIG. 6 shows the beam patterns of a DSB and an MVDR beamformer, designed with a 22-kHz sampling rate and steering direction at zero pi, on a twelve-loudspeaker system. As shown in these plots, other than some high-frequency aliasing, the response for low-frequency contents up to around 1000 Hz is almost uniform across all directions. As a result, low-frequency sounds have poor directionalities from such arrays.

When beamforming techniques are used to produce spatial patterns for broadband signals, selection of the transducer array geometry involves a trade-off between low and high frequencies. To enhance the direct handling of low frequencies by the beamformer, a larger loudspeaker spacing is preferred. At the same time, if the spacing between loudspeakers is too large, the ability of the array to reproduce the desired effects at high frequencies will be limited by a lower aliasing threshold. To avoid spatial aliasing, the wavelength of the highest frequency component to be reproduced by the array should be greater than twice the distance between adjacent loudspeakers.

As consumer devices become smaller and smaller, the form factor may constrain the placement of loudspeaker arrays. For example, it may be desirable for a laptop, netbook, or tablet computer or a high-definition video display to have a built-in loudspeaker array. Due to the size constraints, the loudspeakers may be small and unable to reproduce a desired bass region. Alternatively, the loudspeakers may be large enough to reproduce the bass region but spaced too closely to support beamforming or other acoustic imaging. Thus it may be desirable to provide the processing to produce a bass signal in a closely spaced loudspeaker array in which beamforming is employed.

FIG. 7A shows an example of a cone-type loudspeaker, and FIG. 7B shows an example of a rectangular loudspeaker (e.g., RA11×15×3.5, NXP Semiconductors, Eindhoven, NL). FIG. 7C shows an example of an array of twelve loudspeakers as shown in FIG. 6A, and FIG. 7D shows an example of an array of twelve loudspeakers as shown in FIG. 6B. In the examples of FIGS. 7C and 7D, the inter-loudspeaker distance is 2.6 cm, and the length of the array (31.2 cm) is approximately equal to the width of a typical laptop computer.

Figure 8:
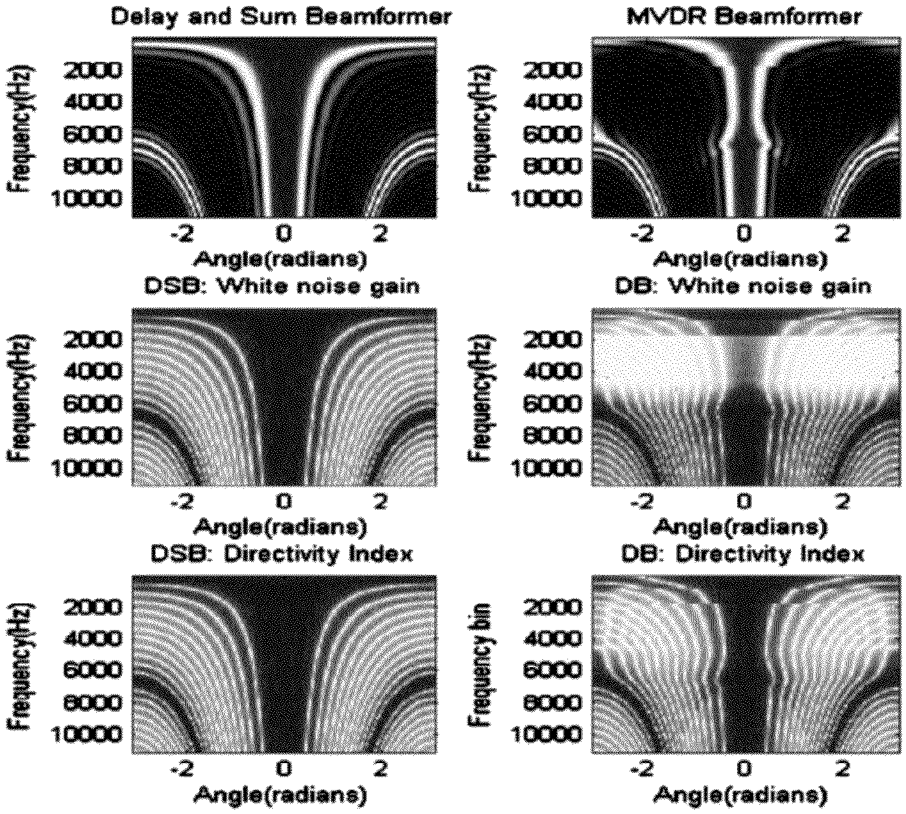
FIG. 8 shows plots of magnitude response (top), white noise gain (middle) and directivity index (bottom) for a delay-and-sum beamformer design (left column) and for an MVDR beamformer design (right column).

For an array with dimensions as discussed above with reference to FIGS. 7C and 7D, FIG. 8 shows plots of magnitude response (top), white noise gain (middle) and directivity index (bottom) for a delay-and-sum beamformer design (left column) and for an MVDR beamformer design (right column). It may be seen from these figures that poor directivity may be expected for frequencies below about 1 kHz.

A psychoacoustic phenomenon exists that listening to higher harmonics of a signal may create a perceptual illusion of hearing the missing fundamentals. Thus, one way to achieve a sensation of bass components from small loudspeakers is to generate higher harmonics from the bass components and play back the harmonics instead of the actual bass components. Descriptions of algorithms for substituting higher harmonics to achieve a psychoacoustic sensation of bass without an actual low-frequency signal presence (also called "psychoacoustic bass enhancement" or PBE) may be found, for example, in U.S. Pat. No. 5,930,373 (Shashoua et al., issued Jul. 27, 1999) and U.S. Publ. Pat. Appls. Nos. 2006/0159283 A1 (Mathew et al., published Jul. 20, 2006), 2009/0147963 A1 (Smith, published Jun. 11, 2009), and 2010/0158272 A1 (Vickers, published Jun. 24, 2010). Such enhancement may be particularly useful for reproducing low-frequency sounds with devices that have form factors which restrict the integrated loudspeaker or loudspeakers to be physically small.

Figure 9A:
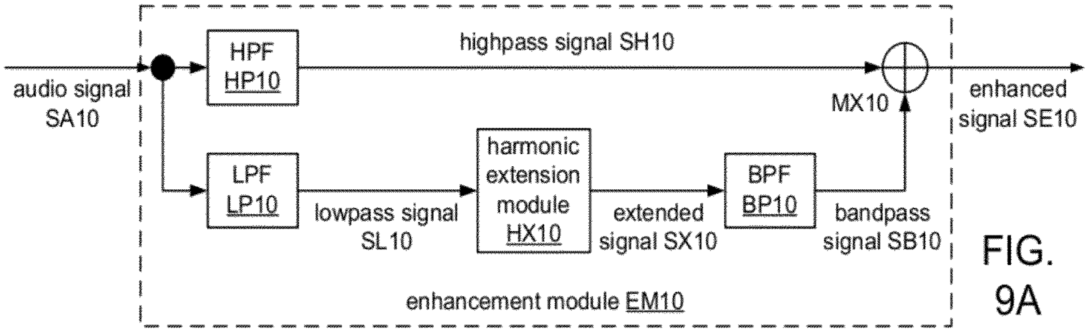
FIG. 9A shows a block diagram of an enhancement module EM10.

FIG. 9A shows a block diagram of an example EM10 of an enhancement module that is configured to perform a PBE operation on an audio signal AS10 to produce an enhanced signal SE10. Audio signal AS10 is a monophonic signal and may be a channel of a multichannel signal (e.g., a stereo signal). In such case, one or more other instances of enhancement module EM10 may be applied to produce corresponding enhanced signals from other channels of the multichannel signal. Alternatively or additionally, audio signal AS10 may be obtained by mixing two or more channels of a multichannel signal to monophonic form.

Module EM10 includes a lowpass filter LP10 that is configured to lowpass filter audio signal AS10 to obtain a lowpass signal SL10 that contains the original bass components of audio signal AS10. It may be desirable to configure lowpass filter LP10 to attenuate its stopband relative to its passband by at least six (or ten, or twelve) decibels. Module EM10 also includes a harmonic extension module HX10 that is configured to harmonically extend lowpass signal SL10 to generate an extended signal SX10, which also includes harmonics of the bass components at higher frequencies. Harmonic extension module HX10 may be implemented as a non-linear device, such as a rectifier (e.g., a full-wave rectifier or absolute-value function), an integrator (e.g., a full-wave integrator), and a feedback multiplier. Other methods of generating harmonics that may be performed by alternative implementations of harmonic extension module HX10 include frequency tracking in the low frequencies. It may be desirable for harmonic extension module HX10 to have amplitude linearity, such that the ratio between the amplitudes of its input and output signals is substantially constant (e.g., within twenty-five percent) at least over an expected range of amplitudes of lowpass signal SL10.

Module EM10 also includes a bandpass filter BP10 that is configured to bandpass filter extended signal SX10 to produce bandpass signal SB10. At the low end, bandpass filter BP10 is configured to attenuate the original bass components. At the high end, bandpass filter BP10 is configured to attenuate generated harmonics that are above a selected cutoff frequency, as these harmonics may cause distortion in the resulting signal. It may be desirable to configure bandpass filter BP10 to attenuate its stopbands relative to its passband by at least six (or ten, or twelve) decibels.

Module EM10 also includes a highpass filter HP10 that is configured to attenuate the original bass components of audio signal AS10 to produce a highpass signal SH10. Filter HP10 may be configured to use the same low-frequency cutoff as bandpass filter BP10 or to use a different (e.g., a lower) cutoff frequency. It may be desirable to configure highpass filter HP10 to attenuate its stopband relative to its passband by at least six (or ten, or twelve) decibels. Mixer MX10 is configured to mix bandpass signal SB10 with highpass signal SH10. Mixer MX10 may be configured to amplify bandpass signal SB10 before mixing it with highpass signal SH10.

Figure 9B:
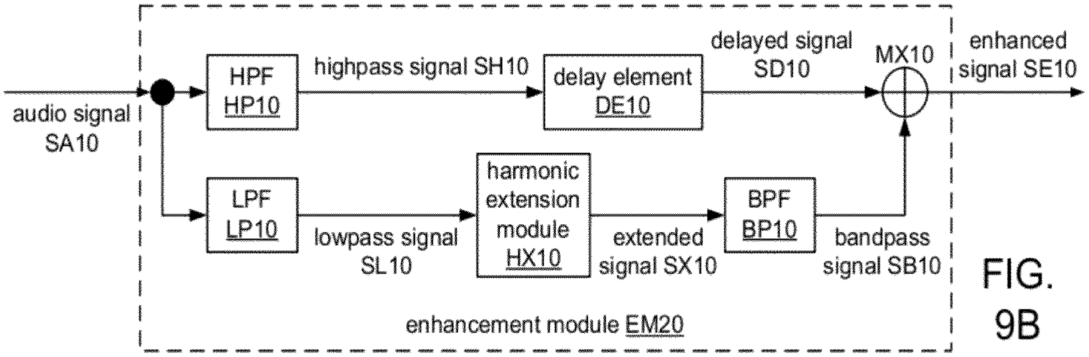
FIG. 9B shows a block diagram of an implementation EM20 of enhancement module EM10.
Figure 10A:
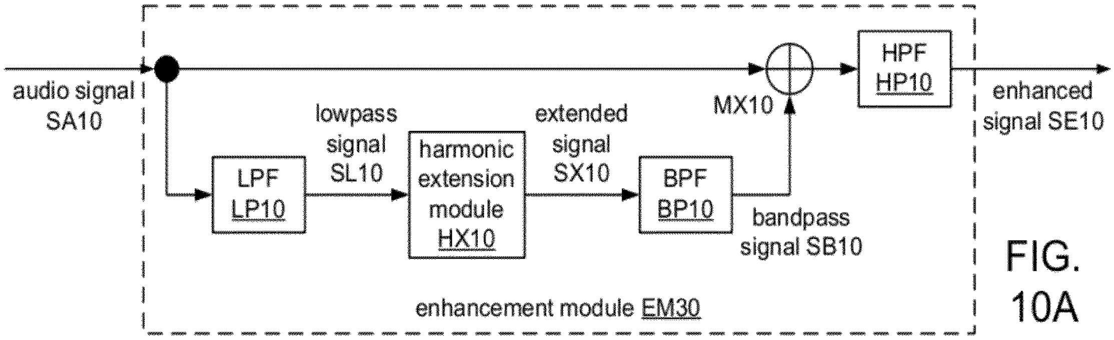
FIG. 10A shows a block diagram of an implementation EM30 of enhancement module EM10.
Figure 10B:
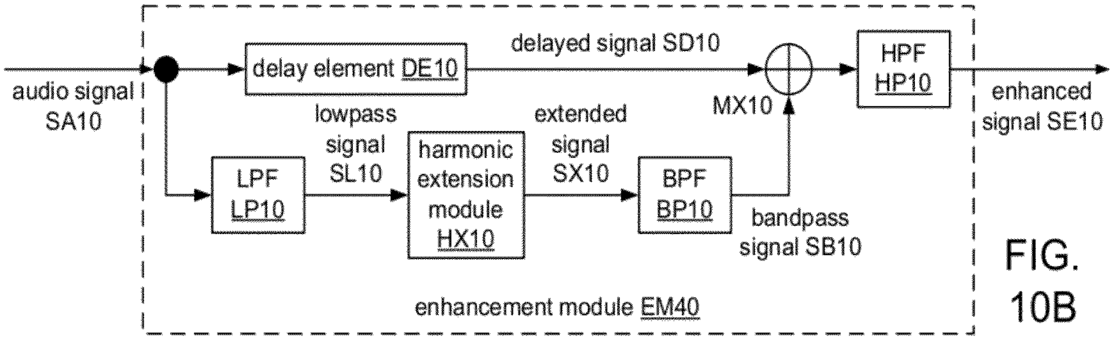
FIG. 10B shows a block diagram of an implementation EM40 of enhancement module EM10.

Processing delays in the harmonic extension path of enhancement module EM10 may cause a loss of synchronization with the passthrough path. FIG. 9B shows a block diagram of an implementation EM20 of enhancement module EM10 that includes a delay element DE10 in the passthrough path that is configured to delay highpass signal SH10 to compensate for such delay. In this case, mixer MX10 is arranged to mix the resulting delayed signal SD10 with bandpass signal SB10. FIGS. 10A and 10B show alternate implementations EM30 and EM40 of modules EM10 and EM20, respectively, in which highpass filter HP10 is applied downstream of mixer MX10 to produce enhanced signal SE10.

Figure 11:
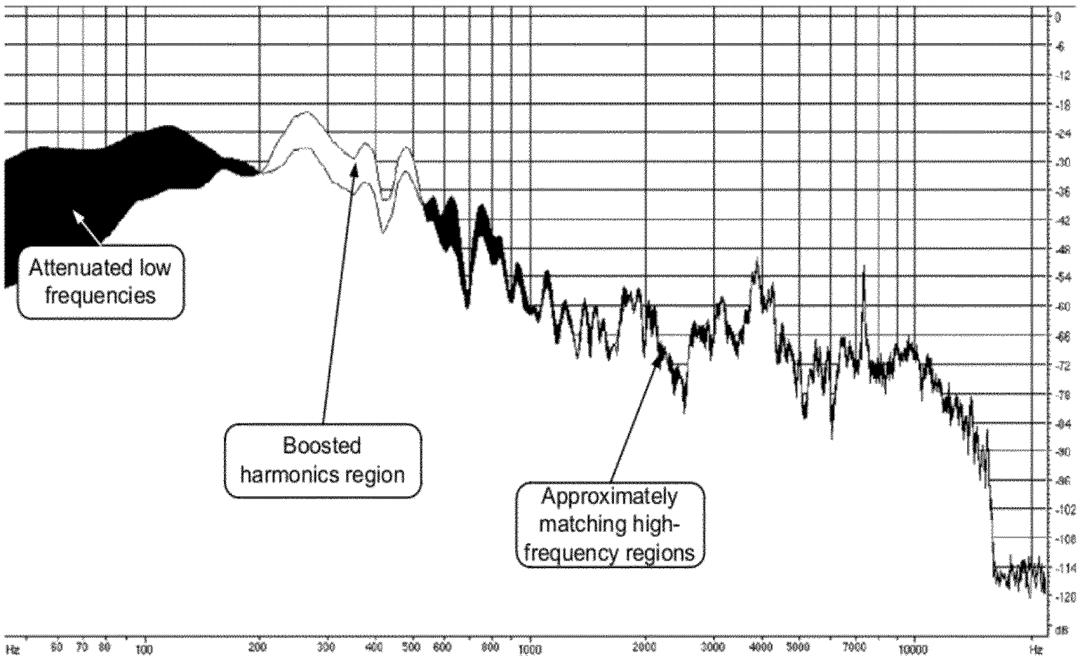
FIG. 11 shows an example of a frequency spectrum of a music signal before and after PBE processing.

FIG. 11 shows an example of a frequency spectrum of a music signal before and after PBE processing (e.g., by an implementation of enhancement module EM10). In this figure, the background (black) region and the line visible at about 200 to 500 Hz indicates the original signal (e.g., SA10), and the foreground (white) region indicates the enhanced signal (e.g., SE10). It may be seen that in the low-frequency band (e.g., below 200 Hz), the PBE operation attenuates around 10 dB of the actual bass. Because of the enhanced higher harmonics from about 200 Hz to 600 Hz, however, when the enhanced music signal is reproduced using a small speaker, it is perceived to have more bass than the original signal.

It may be desirable to apply PBE not only to reduce the effect of low-frequency reproducibility limits, but also to reduce the effect of directivity loss at low frequencies. For example, it may be desirable to combine PBE with beamforming to create the perception of low-frequency content in a range that is steerable by a beamformer. The use of a loudspeaker array to produce directional beams from an enhanced signal results in an output that has a much lower perceived frequency range than an output from the audio signal without such enhancement. Additionally, it becomes possible to use a more relaxed beamformer design to steer the enhanced signal, which may support a reduction of artifacts and/or computational complexity and allow more efficient steering of bass components with arrays of small loudspeakers. At the same time, such a system can protect small loudspeakers from damage by low-frequency signals (e.g., rumble).

Figure 12A:
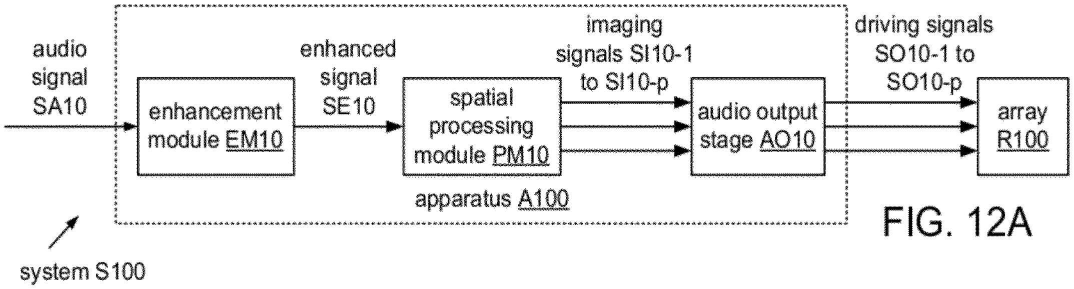
FIG. 12A shows a block diagram of a system S100 according to a general configuration.

FIG. 12A shows a block diagram of a system S100 according to a general configuration. System S100 includes an apparatus A100 and an array of loudspeakers R100. Apparatus A100 includes an instance of enhancement module EM10 configured to process audio signal SA10 to produce enhanced signal SE10 as described herein. Apparatus A100 also includes a spatial processing module PM10 configured to perform a spatial processing operation (e.g., beamforming, beam generation, or another acoustic imaging operation) on enhanced signal SE10 to produce a plurality P of imaging signals SI10-1 to SI10-*p*. Apparatus A100 also includes an audio output stage AO10 configured to process each of the P imaging signals to produce a corresponding one of a plurality P of driving signals SO10-1 to SO10-*p* and to apply each driving signal to a corresponding loudspeaker of array R100. It may be desirable to implement array R100, for example, as an array of small loudspeakers or an array of large loudspeakers in which the individual loudspeakers are spaced closely together.

Low-frequency signal processing may present similar challenges with other spatial processing techniques, and implementations of system S100 may be used in such cases to improve the perceptual low-frequency response and reduce a burden of low-frequency design on the original system. For example, spatial processing module PM10 may be implemented to perform a spatial processing technique other than beamforming. Examples of such techniques include wavefield synthesis (WFS), which is typically used to resynthesize the realistic wavefront of a sound field. Such an approach may use a large number of speakers (e.g., twelve, fifteen, twenty, or more) and is generally implemented to achieve a uniform listening experience for a group of people rather than for a personal space use case.

Figure 12B:
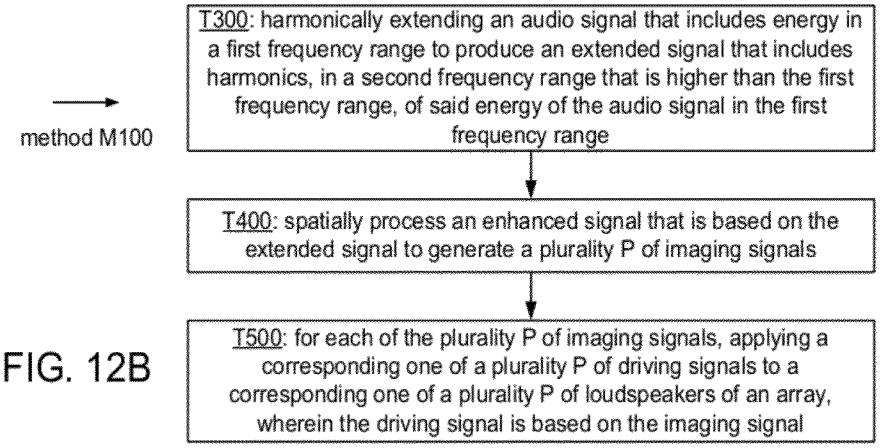
FIG. 12B shows a flowchart of a method M100 according to a general configuration.

FIG. 12B shows a flowchart of a method M100 according to a general configuration that includes tasks T300, T400, and T500. Task T300 harmonically extends an audio signal that includes energy in a first frequency range to produce an extended signal that includes harmonics, in a second frequency range that is higher than the first frequency range, of said energy of the audio signal in the first frequency range (e.g., as described herein with reference to implementations of enhancement module EM10). Task T400 spatially processes an enhanced signal that is based on the extended signal to generate a plurality P of imaging signals (e.g., as discussed herein with reference to implementations of spatial processing module PM10). For example, task T400 may be configured to perform a beamforming, wavefield synthesis, or other acoustic imaging operation on the enhanced audio signal.

For each of the plurality P of imaging signals, task T500 applies a corresponding one of a plurality P of driving signals to a corresponding one of a plurality P of loudspeakers of an array, wherein the driving signal is based on the imaging signal. In one example, the array is mounted on a portable computing device (e.g., a laptop, netbook, or tablet computer).

FIG. 13A shows a block diagram of an implementation PM20 of spatial processing module PM10 that includes a plurality of spatial processing filters PF10-1 to PF10-*p*, each arranged to process enhanced signal SE10 to produce a corresponding one of a plurality P of imaging signals SI10-1 to SI10-*p*. In one example, each filter PF10-1 to PF10-*p* is a beamforming filter (e.g., an FIR or IIR filter), whose coefficients may be calculated using an LCMV, MVDR, BSS, or other directional processing approach as described herein. The corresponding response of array R100 may be expressed as:

$$B(\omega, \theta) = \sum_{n=-M}^{M} W_n(\omega) e^{j\omega\tau_n(\theta)},$$

where ω denotes frequency and θ denotes the desired beam angle, the number of loudspeakers is P=2M+1, $W_n(\omega)=\Sigma_{k=0}^{L-1}-w_n(k)\exp(-jk\omega)$ is the frequency response of spatial processing filter PF10-($i$−M−1) (for 1<=i<=P), $w_n(k)$ is the impulse response of spatial processing filter PF10-($i$−M−1), $\tau_n(\theta)$=nd cos θ$f_s$/c, c is the speed of sound, d is the inter-loudspeaker spacing, $f_s$ is the sampling frequency, k is a time-domain sample index, and L is the FIR filter length.

The contemplated uses for such a system include a wide range of applications, from an array on a handheld device (e.g., a smartphone) to a large array (e.g., total length of up to 1 meter or more), which may be mounted above or below a large-screen television, although larger installations are also within the scope of this disclosure. In practice, it may be desirable for array R100 to have at least four loudspeakers, and in some applications, an array of six loudspeakers may be sufficient. Other examples of arrays that may be used with the directional processing, PBE, and/or tapering approaches described herein include the YSP line of speaker bars (Yamaha Corp., JP), the ES7001 speaker bar (Marantz America, Inc., Mahwah, N.J.), the CSMP88 speaker bar (Coby Electronics Corp., Lake Success, N.Y.), and the Panaray MA12 speaker bar (Bose Corp., Framingham, Mass.). Such arrays may be mounted above or below a video screen, for example.

It may be desirable to highpass-filter enhanced signal SE10 (or a precursor of this signal) to remove low-frequency energy of input audio signal SA10. For example, it may be desirable to remove energy in frequencies below those which the array can effectively direct (as determined by, e.g., the inter-loudspeaker spacing), as such energy may cause poor beamformer performance.

Since low-frequency beam pattern reproduction depends on array dimension, beams tend to widen in the low-frequency range, resulting in a non-directional low-frequency sound image. One approach to correcting the low-frequency directional sound image is to use various aggressiveness settings of the enhancement operation, such that low- and high-frequency cutoffs in this operation are selected as a function of the frequency range in which the array can produce a directional sound image. For example, it may be desirable to select a low-frequency cutoff as a function of inter-transducer spacing to remove non-directable energy and/or to select a high-frequency cutoff as a function of inter-transducer spacing to attenuate high-frequency aliasing.

Another approach is to use an additional high-pass filter at the PBE output, with its cutoff set as a function of the frequency range in which the array can produce a directional sound image. FIG. 13B shows a block diagram of such an implementation A110 of apparatus A100 that includes a high-pass filter HP20 configured to highpass filter enhanced signal SE10 upstream of spatial processing module PM10. FIG. 13C shows an example of the magnitude response of highpass filter HP20, in which the cutoff frequency fc is selected according to the inter-loudspeaker spacing. It may be desirable to configure highpass filter HP20 to attenuate its stopband relative to its passband by at least six (or ten, or twelve) decibels. Similarly, the high-frequency range is subject to spatial aliasing, and it may be desirable to use a low-pass filter on the PBE output, with its cutoff defined as a function of inter-transducer spacing to attenuate high-frequency aliasing.

It may be desirable to configure such a lowpass filter to attenuate its stopband relative to its passband by at least six (or ten, or twelve) decibels.

Figure 14:
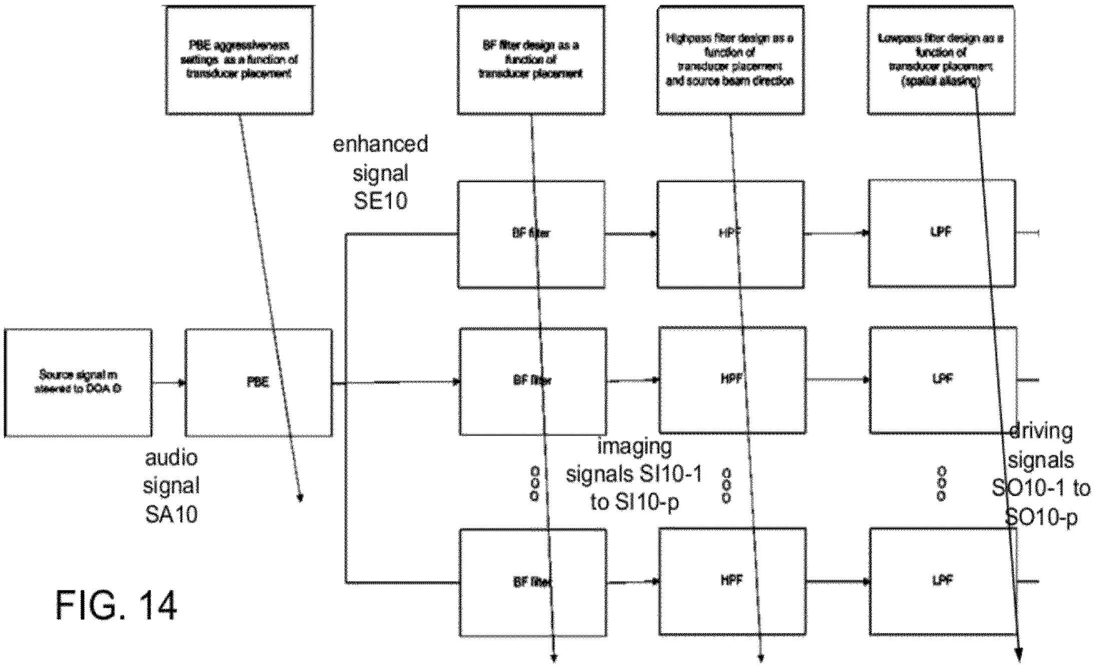
FIG. 14 shows a block diagram of a configuration similar to apparatus A110.

FIG. 14 shows a block diagram of a similar configuration. In this example, a monophonic source signal to be steered to direction θ (e.g., audio signal SA10) is enhanced using a PBE operation as described herein, such that the low- and high-frequency cutoffs in the PBE module are set as a function of the transducer placement (e.g., the inter-loudspeaker spacing, to avoid low frequencies that the array may not effectively steer and high frequencies that may cause spatial aliasing). The enhanced signal SE10 is processed by a plurality of processing paths to produce a corresponding plurality of driving signals, such that each path includes a corresponding beamformer filter, high-pass filter, and low-pass filter whose designs are functions of the transducer placement (e.g., inter-loudspeaker spacing). It may be desirable to configure each such filter to attenuate its stopband relative to its passband by at least six (or ten, or twelve) decibels. For an array having dimensions as discussed above with reference to FIGS. 9 and 10, it may be expected that the beam width will be too wide for frequencies below 1 kHz, and that spatial aliasing may occur at frequencies above 6 kHz. In the example of FIG. 14, the high-pass filter design is also selected according to the beam direction, such that little or no highpass filtering is performed in the desired direction, and the highpass filtering operation is more aggressive (e.g., has a lower cutoff and/or more stopband attenuation) in other directions. The highpass and lowpass filters shown in FIG. 14 may be implemented, for example, within audio output stage AO10.

Figure 15:
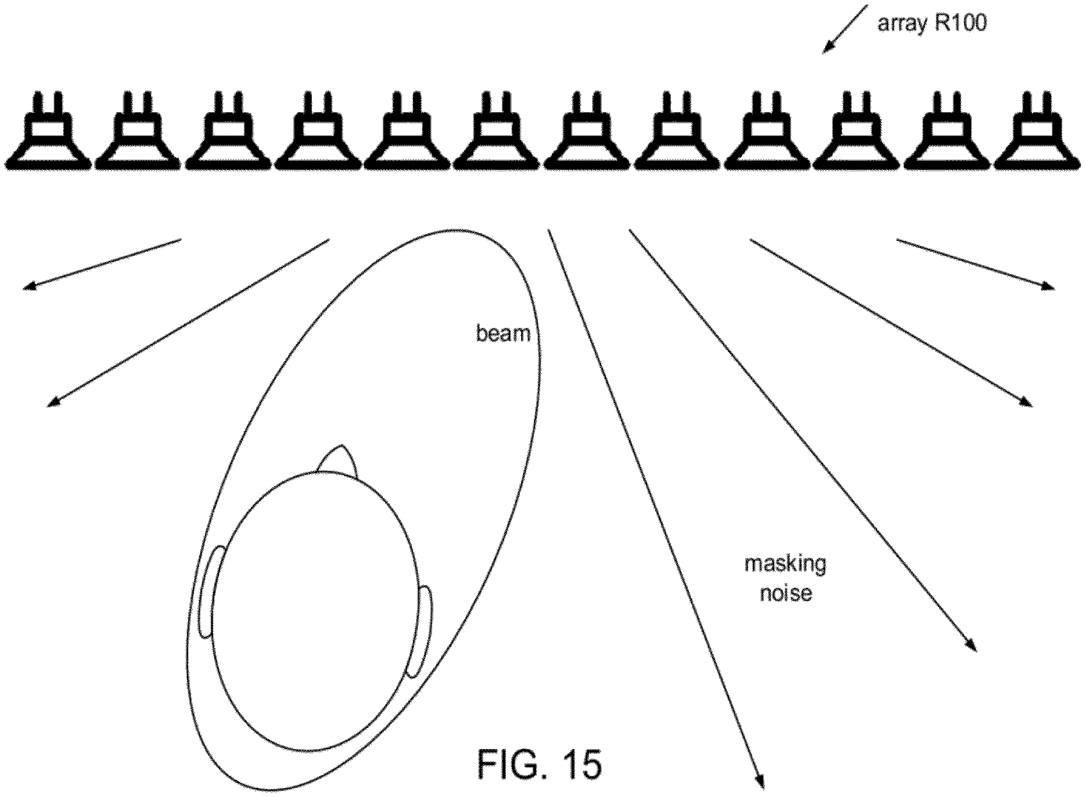
FIG. 15 shows an example of masking noise.

When a loudspeaker array is used to steer a beam in a particular direction, it is likely that the sound signal will still be audible in other directions as well (e.g., in the directions of sidelobes of the main beam). It may be desirable to mask the sound in other directions (e.g., to mask the remaining sidelobe energy) using masking noise, as shown in FIG. 15.

Figure 16:
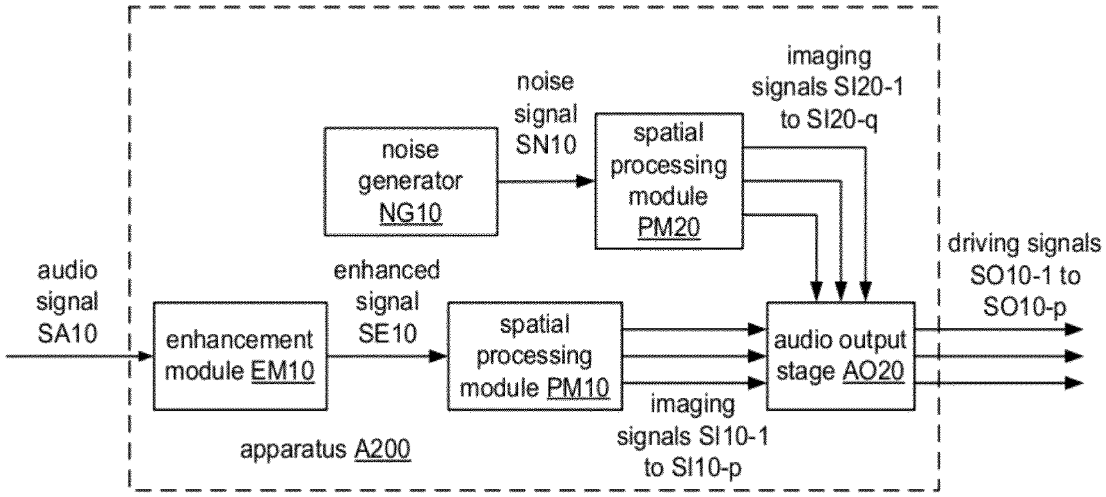
FIG. 16 shows a block diagram of an implementation A200 of apparatus A100.

FIG. 16 shows a block diagram of such an implementation A200 of apparatus A100 that includes a noise generator NG10 and a second instance PM20 of spatial processing module PM10. Noise generator NG10 produces a noise signal SN10. It may be desirable for the spectral distribution of noise signal SN10 to be similar to that of the sound signal to be masked (i.e., audio signal SA10). In one example, babble noise (e.g., a combination of several human voices) is used to mask the sound of a human voice. Other examples of noise signals that may be generated by noise generator NG10 include white noise, pink noise, and street noise.

Spatial processing module PM20 performs a spatial processing operation (e.g., beamforming, beam generation, or another acoustic imaging operation) on noise signal SN10 to produce a plurality Q of imaging signals SI20-1 to SI20-*q*. The value of Q may be equal to P. Alternatively, Q may be less than P, such that fewer loudspeakers are used to create the masking noise image, or greater than P, such that fewer loudspeakers are used to create the sound image being masked.

Spatial processing module PM20 may be configured such that apparatus A200 drives array R100 to beam the masking noise to specific directions, or the noise may simply be spatially distributed. It may be desirable to configure apparatus A200 to produce a masking noise image that is stronger than each desired sound source outside the main lobe of the beam of each desired source.

In a particular application, a multi-source implementation of apparatus A200 as described herein is configured to drive array R100 to project two human voices in different (e.g., opposite) directions, and babble noise is used to make the residual voices fade into the background babble noise outside of those directions. In such case, it is very difficult to perceive what the voices are saying in directions other than the desired directions, because of the masking noise.

The spatial image produced by a loudspeaker array at a user's location (e.g., by generation of a beam and null beam, or by inverse filtering) is typically most effective when the axis of the array is broadside to (i.e., parallel to) the axis of the user's ears. Head movements by a listener may result in suboptimal sound image generation for a given array. When the user turns his or her head sideways, for example, the desired spatial imaging effect may no longer be available. In order to maintain a consistent sound image, it is typically important to know the location and orientation of the user's head such that beams may be steered in appropriate directions with respect to the user's ears. It may be desirable to implement system S100 to produce a spatial image that is robust to such head movements.

Figure 17:
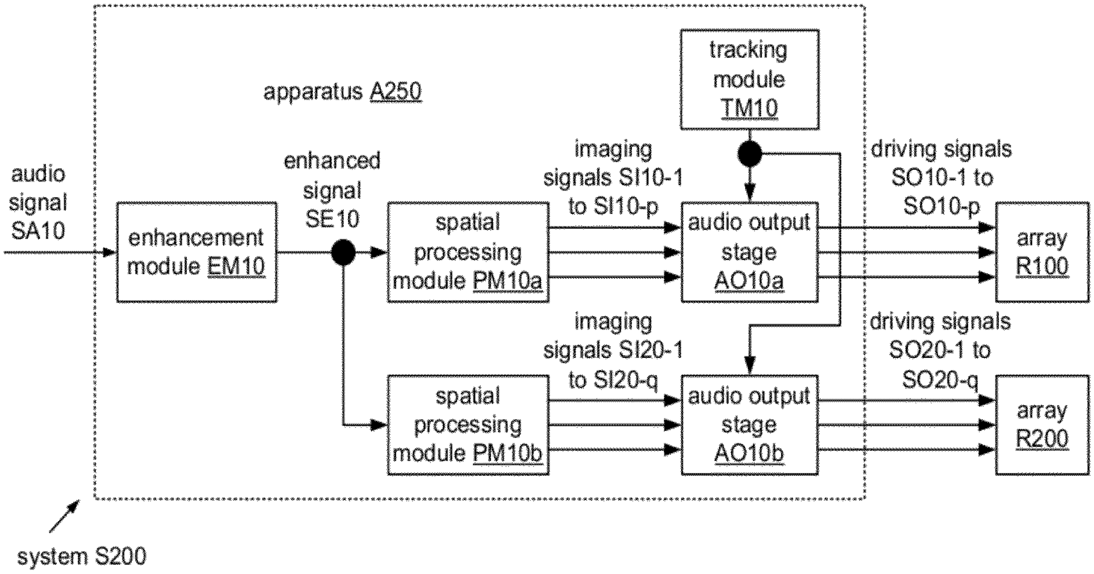
FIG. 17 shows a block diagram of an implementation S200 of system S100.

FIG. 17 shows a block diagram of an implementation S200 of system S100 that includes an implementation A250 of apparatus A100 and a second loudspeaker array R200 having a plurality Q of loudspeakers, where Q may be the same as or different than P. Apparatus A250 includes an instance PM10*a* of spatial processing module PM10 that is configured to perform a spatial processing operation on enhanced signal SE10 to produce imaging signals SI10-1 to SI10-*p*, and an instance PM10*b* of spatial processing module PM10 that is configured to perform a spatial processing operation on enhanced signal SE10 to produce imaging signals SI20-1 to SI20-*q*. Apparatus A250 also includes corresponding instances AO10*a*, AO10*b* of audio output stage AO10 as described herein.

Figure 18:
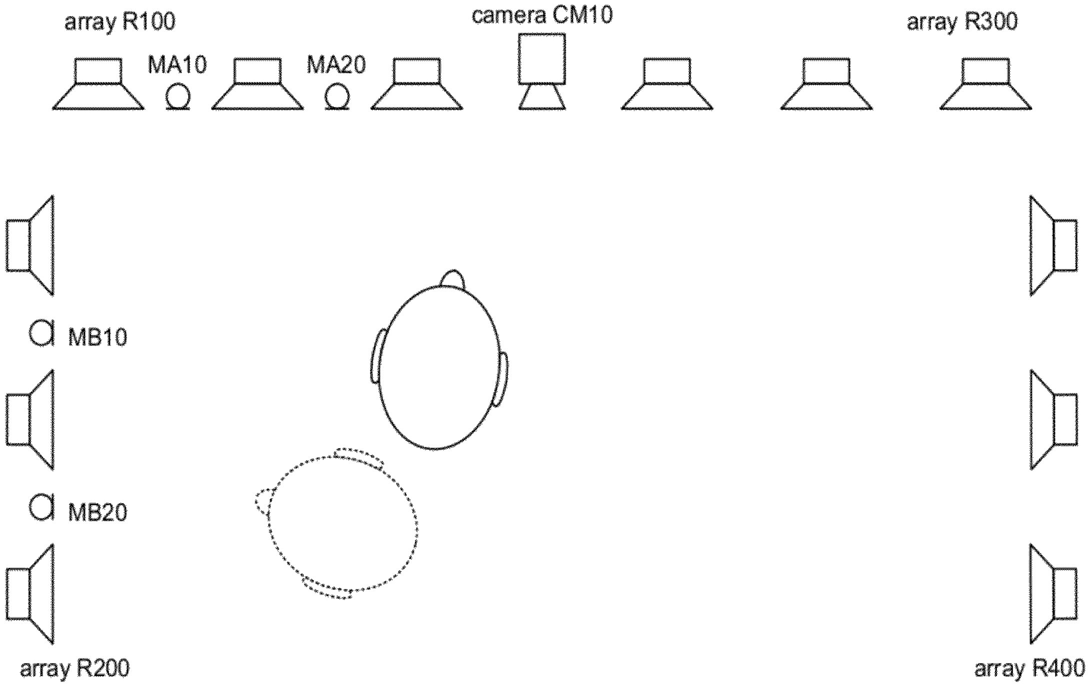
FIG. 18 shows a top view of an example of an application of system S200.

Apparatus A250 also includes a tracking module TM10 that is configured to track a location and/or orientation of the user's head and to enable a corresponding instance AO10*a* or AO10*b* of audio output stage AO10 to drive a corresponding one of arrays R100 and R200 (e.g., via a corresponding set of driving signals SO10-1 to SO10-*p* or SO20-1 to SO20-*q*). FIG. 18 shows a top view of an example of an application of system S200.

Tracking module TM10 may be implemented according to any suitable tracking technology. In one example, tracking module TM10 is configured to analyze video images from a camera CM10 (e.g., as shown in FIG. 18) to track facial features of a user and possibly to distinguish and separately track two or more users. Alternatively or additionally, tracking module TM10 may be configured to track the location and/or orientation of a user's head by using two or more microphones to estimate a direction of arrival (DOA) of the user's voice. FIG. 18 shows a particular example in which a pair of microphones MA10, MA20 interlaced among the loudspeakers of array R100 is used to detect the presence and/or estimate the DOA of the voice of a user facing array R100, and a different pair of microphones MB10, MB20 interlaced among the loudspeakers of array R200 is used to detect the presence and/or estimate the DOA of the voice of a user facing array R200. Further examples of implementations of tracking module TM10 may be configured to use ultrasonic orientation tracking as described in U.S. Pat. No. 7,272,073 B2 (Pellegrini, issued Sep. 18, 2007) and/or ultrasonic location tracking as described in U.S. Prov'l Pat. Appl. No. 61/448,950 (filed Mar. 3, 2011). Examples of applications for system S200 include audio and/or videoconferencing and audio and/or video telephony.

It may be desirable to implement system S200 such that arrays R100 and R200 are orthogonal or substantially orthogonal (e.g., having axes that form an angle of at least sixty or seventy degrees and not more than 110 or 120 degrees). When tracking module TM10 detects that the user's head turns to face a particular array, module TM10 enables audio output stage AO10*a* or AO10*b* to drive that array according to the corresponding imaging signals. As shown in FIG. 18, it may be desirable to implement system S200 to support selection among two, three, or four or more different arrays. For example, it may be desirable to implement system S200 to support selection among different arrays at different locations along the same axis (e.g., arrays R100 and R300), and/or selection among arrays facing in opposite directions (e.g., arrays R200 and R400), according to a location and/or orientation as indicated by tracking module TM10.

Previous approaches to loudspeaker arrays use uniform linear arrays (e.g., an array of loudspeakers arranged along a linear axis that has a uniform spacing between adjacent loudspeakers). If the inter-loudspeaker distance in a uniform linear array is small, fewer frequencies will be affected by spatial aliasing but spatial beampattern generation in the low frequencies will be poor. A large inter-loudspeaker spacing will yield better low-frequency beams, but in this case high-frequency beams will be scattered due to spatial aliasing. Beam widths are also dependent on transducer array dimension and placement.

One approach to reducing the severity of the trade-off between low-frequency performance and high-frequency performance is to sample the loudspeakers out of a loudspeaker array. In one example, sampling is used to create a subarray having a larger spacing between adjacent loudspeakers, which can be used to steer low frequencies more effectively.

In this case, use of a subarray in some frequency bands may be complemented by use of a different subarray in other frequency bands. It may be desirable to increase the number of enabled loudspeakers as the frequency of the signal content increases (alternatively, to reduce the number of enabled loudspeakers as the frequency of the signal content decreases).

Figure 19:
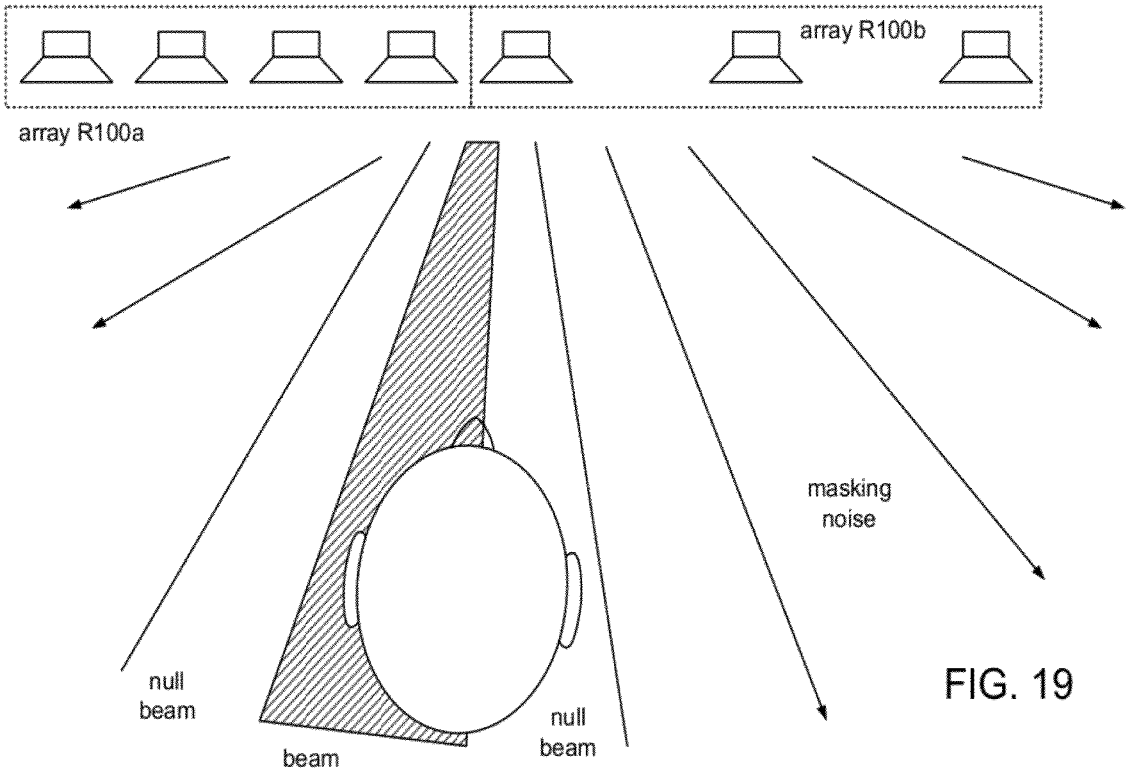
FIG. 19 shows a diagram of a configuration of non-linearly spaced loudspeakers in an array.

FIG. 19 shows a diagram of a configuration of non-linearly spaced loudspeakers in an array. In this example, a subarray R100*a* of loudspeakers that are spaced closer together are used to reproduce higher frequency content in the signal, and a subarray R100*b* of loudspeakers that are further apart are used for output of the low-frequency beams.

Figure 20:
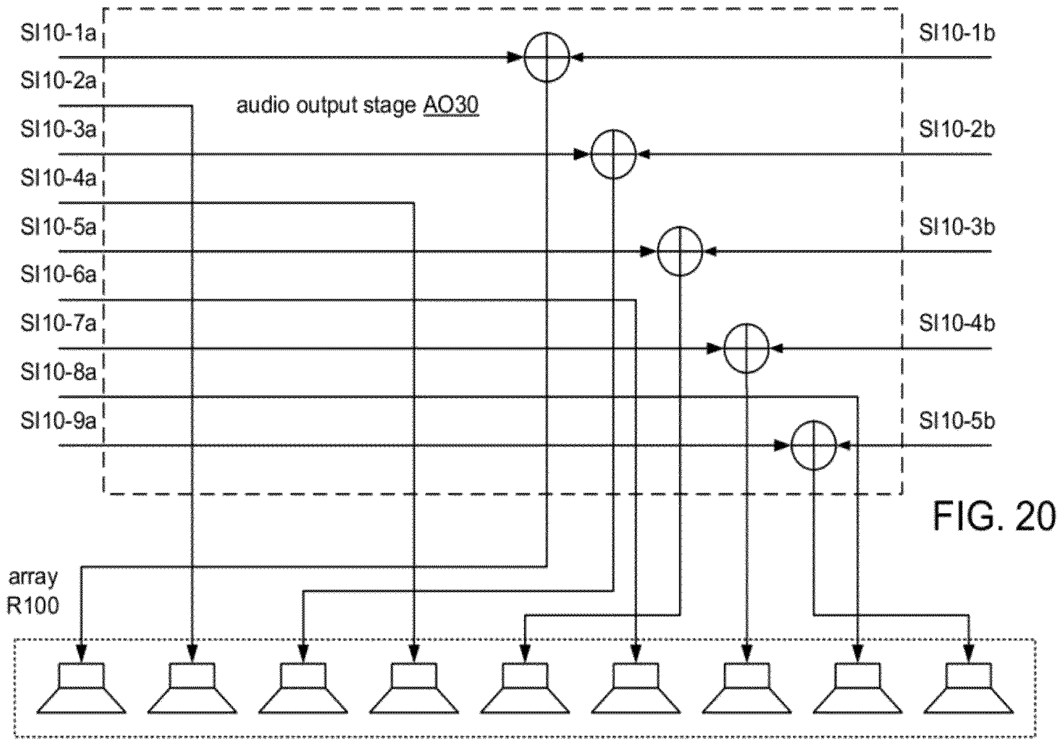
FIG. 20 shows a diagram of a mixing function of an implementation AO30 of audio output stage AO20.

It may be desirable to enable all of the loudspeakers for the highest signal frequencies. FIG. 20 shows a diagram of a mixing function of an implementation AO30 of audio output stage AO20 for such an example in which array R100 is sampled to create two effective subarrays: a first array (all of the loudspeakers) for reproduction of high frequencies, and a second array (every other loudspeaker) having a larger inter-loudspeaker spacing for reproduction of low frequencies. (For clarity, in this example, other functions of the audio output stage, such as amplification, filtering, and/or impedance matching, are not shown.)

Figure 21:
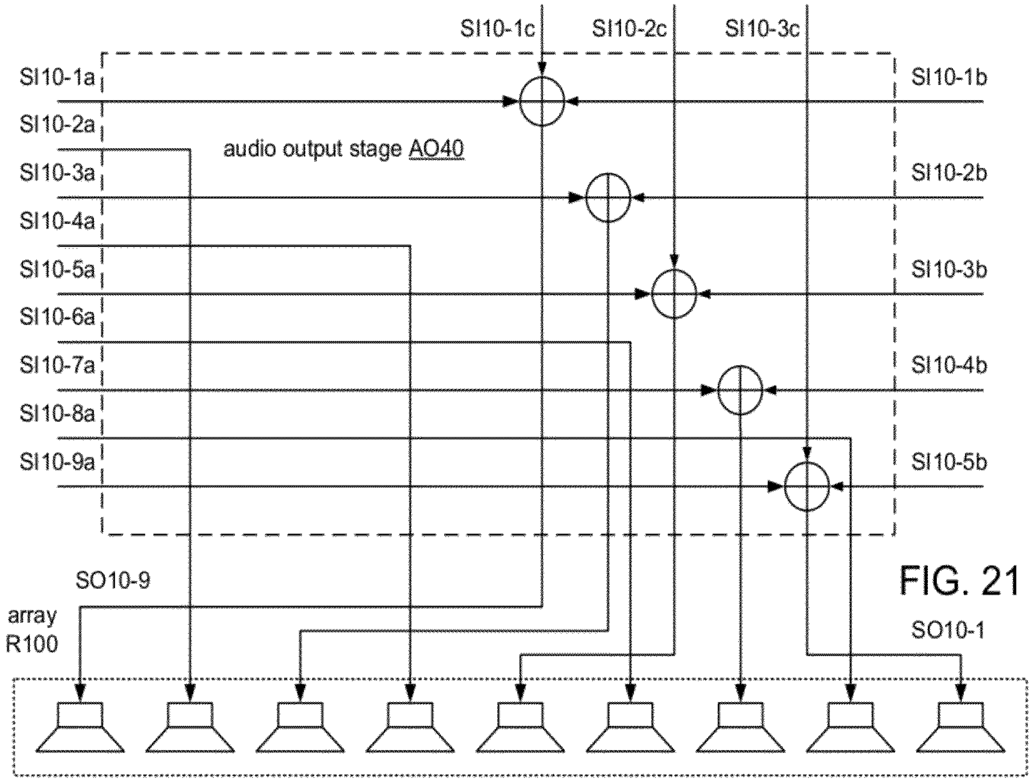
FIG. 21 shows a diagram of a mixing function of an implementation AO40 of audio output stage AO20.

FIG. 21 shows a diagram of a mixing function of an implementation AO40 of audio output stage AO20 for an example in which array R100 is sampled to create three effective subarrays: a first array (all of the loudspeakers) for reproduction of high frequencies, a second array (every second loudspeaker) having a larger inter-loudspeaker spacing for reproduction of middle frequencies, and a third array (every third loudspeaker) having an even larger inter-loudspeaker spacing for reproduction of low frequencies. Such creation of subarrays having mutually nonuniform spacing may be used to obtain similar beam widths for different frequency ranges even for a uniform array.

In another example, sampling is used to obtain a loudspeaker array having nonuniform spacing, which may be used to obtain a better compromise between sidelobes and mainlobes in low- and high-frequency bands. It is contemplated that subarrays as described herein may be driven individually or in combination to create any of the various imaging effects described herein (e.g., masking noise, multiple sources in different respective directions, direction of a beam and a corresponding null beam at respective ones of the user's ears, etc.).

The loudspeakers of the different subarrays, and/or loudspeakers of different arrays (e.g., R100, R200, R300, and/or R400 as shown in FIG. 18), may be configured to communicate through conductive wires, fiber-optic cable (e.g., aTOSLINK cable, such as via an S/PDIF connection), or wirelessly (e.g., through a Wi-Fi (e.g., IEEE 802.11) connection). Other examples of wireless methods that may be used to support such a communications link include low-power radio specifications for short-range communications (e.g., from a few inches to a few feet) such as Bluetooth (e.g., a Headset or other Profile as described in the Bluetooth Core Specification version 4.0 [which includes Classic Bluetooth, Bluetooth high speed, and Bluetooth low energy protocols], Bluetooth SIG, Inc., Kirkland, Wash.), Peanut (QUALCOMM Incorporated, San Diego, Calif.), and ZigBee (e.g., as described in the ZigBee 2007 Specification and/or the ZigBee RF4CE Specification, ZigBee Alliance, San Ramon, Calif.). Other wireless transmission channels that may be used include non-radio channels such as infrared and ultrasonic. It may be desirable to use such communication between different arrays and/or subarrays to generate wavefields. Such communication may include relaying beam designs, coordinating beampatterns that vary in time between arrays, playing back audio signals, etc. In one example, different arrays as shown in FIG. 18 are driven by respective laptop computers that communicate over a wired and/or wireless connection to adaptively direct one or more common audio sources in desired respective directions.

It may be desirable to combine subband sampling with a PBE technique as described herein. The use of such a sampled array to produce highly directional beams from a PBE-extended signal results in an output that has a much lower perceived frequency range than an output from the signal without PBE.

Figure 22:
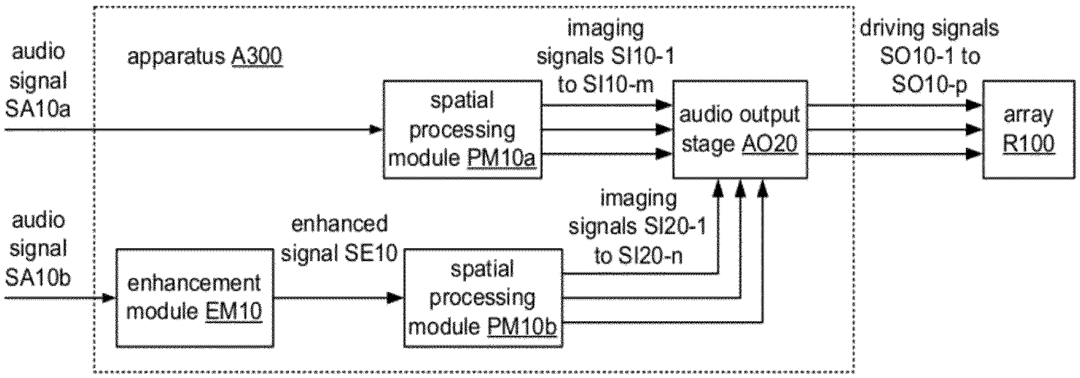
FIG. 22 shows a block diagram of an implementation A300 of apparatus A100.

FIG. 22 shows a block diagram of an implementation A300 of apparatus A100. Apparatus A300 includes an instance PM10*a* of spatial processing module PM10 that is configured to perform a spatial processing operation on an audio signal SA10*a* to produce imaging signals SI10-1 to SI10-*m*, and an instance PM10*b* of spatial processing module PM10 that is configured to perform a spatial processing operation on enhanced signal SE10 to produce imaging signals SI20-1 to SI20-*n*.

Apparatus A300 also includes an instance of audio output stage AO20 that is configured to apply a plurality P of driving signals SO10-1 to SO10-*p* to corresponding plurality P of loudspeakers of array R100. The set of driving signals SO10-1 to SO10-*p* includes M driving signals, each based on a corresponding one of imaging signals SI10-1 to SI10-*m*, that are applied to a corresponding subarray of M loudspeakers of array R100. The set of driving signals SO10-1 to SO10-*p* also includes N driving signals, each based on a corresponding one of imaging signals SI20-1 to SI20-*n*, that are applied to a corresponding subarray of N loudspeakers of array R100.

The subarrays of M and N loudspeakers may be separate from each other (e.g., as shown in FIG. 19 with reference to arrays R100*a* and R100*b*). In such case, P is greater than both M and N. Alternatively, the subarrays of M and N loudspeakers may be different but overlapping. In one such example, M is equal to P, and the subarray of M loudspeakers includes the subarray of N loudspeakers (and possibly all of the loudspeakers in the array). In this particular case, the plurality of M driving signals also includes the plurality of N driving signals. The configuration shown in FIG. 20 is one example of such a case.

Figure 37:
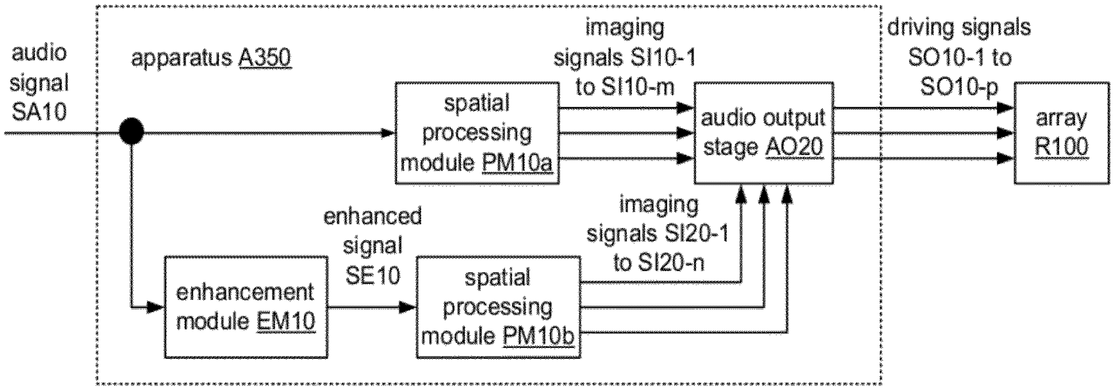
FIG. 37 shows a block diagram of an implementation A350 of apparatus A100.

As shown in FIG. 22, the audio signals SA10*a* and SA10*b* may be from different sources. In this case, spatial processing modules PM10*a* and PM10*b* may be configured to direct the two signals in similar directions or independently of each other. FIG. 37 shows a block diagram of an implementation A350 of apparatus A300 in which both imaging paths are based on the same audio signal SA10. In this case, it may be desirable for modules PM10*a* and PM10*b* to direct the respective images in the same direction, such that an overall image of audio signal SA10 is improved.

It may be desirable to configure audio output stage AO20 to apply the driving signals that correspond to imaging signals SI20-1 to SI20-*n* (i.e., to the enhancement path) to a subarray having a larger inter-loudspeaker spacing, and to apply the driving signals that correspond to imaging signals SI10-1 to SI10-*m* to a subarray having a smaller inter-loudspeaker spacing. Such a configuration allows enhanced signal SE10 to support an improved perception of spatially imaged low-frequency content. It may also be desirable to configure one or more (possibly all) lowpass and/or highpass filter cutoffs to be lower in the enhancement path of apparatus A300 and A350 than in the other path, to provide for different onsets of directionality loss and spatial aliasing.

Figure 23A:
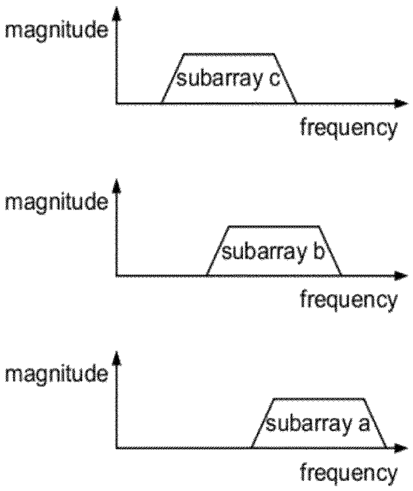
FIG. 23A shows an example of three different bandpass designs for the processing paths for a three-subarray scheme.

For a case in which an enhanced signal (e.g., signal SE10) is used to drive a sampled array, it may be desirable to use different designs for the processing paths of the various subarrays. FIG. 23A shows an example of three different bandpass designs for the processing paths for a three-subarray scheme as described above with reference to FIG. 21. In each case, the band is selected according to the inter-loudspeaker spacing for the particular subarray. For example, the low-frequency cutoff may be selected according to the lowest frequency that the subarray can effectively steer, and the high-frequency cutoff may be selected according to the frequency at which spatial aliasing is expected to begin (e.g., such that the wavelength of the highest frequency passed is more than two times greater than the inter-loudspeaker spacing). It is expected that the lowest frequency that each loudspeaker can effectively reproduce will be much lower than the lowest frequency that the subarray with the highest inter-loudspeaker spacing (i.e., subarray c) can effectively steer, but in the event that this is not the case, the low-frequency cutoff may be selected according to the lowest reproducible frequency.

Figure 23B:
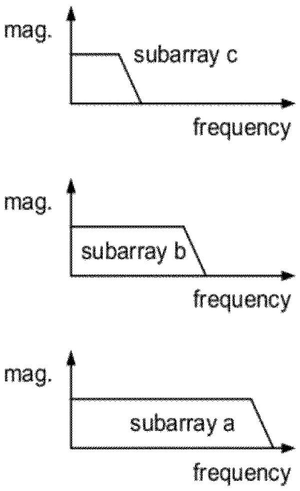
FIG. 23B shows an example of three different lowpass designs for a three-subarray scheme.

For a case in which an enhanced signal is used to drive a sampled array, it may be desirable to use a different instance of the PBE operation for each of one or more of the subarrays, with a different design for the lowpass filter at the input to the harmonic extension operation of each PBE operation. FIG. 23B shows an example of three different lowpass designs for a three-subarray scheme as described above with reference to FIG. 21. In each case, the cutoff is selected according to the inter-loudspeaker spacing for the particular subarray. For example, the low-frequency cutoff may be selected according to the lowest frequency that the subarray can effectively steer (alternatively, the lowest reproducible frequency).

Figure 23C:
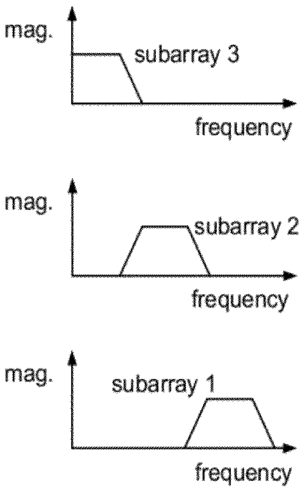
FIG. 23C shows an example in which a low-frequency cutoff for a lowpass filter for each of the higher-frequency subarrays is selected according to the highpass cutoff of the subarray for the next lowest frequency band.

An overly aggressive PBE operation may give rise to undesirable artifacts in the output signal, such that it may be desirable to avoid unnecessary use of PBE. For a case in a different instance of the PBE operation is used for each of one or more of the subarrays, it may be desirable to use a bandpass filter in place of the lowpass filter at the inputs to the harmonic extension operations of the higher-frequency subarrays. FIG. 23C shows an example in which the low-frequency cutoff for this lowpass filter for each of the higher-frequency subarrays is selected according to the highpass cutoff of the subarray for the next lowest frequency band. In a further alternative, only the lowest-frequency subarray receives a PBE-enhanced signal (e.g., as discussed herein with reference to apparatus A300 and A350). Implementations of apparatus A300 and A350 having more than one enhancement path and/or more than one non-enhancement path are expressly contemplated and hereby disclosed, as are implementations of apparatus A300 and A350 in which both (e.g., all) paths are enhanced.

Figure 24:
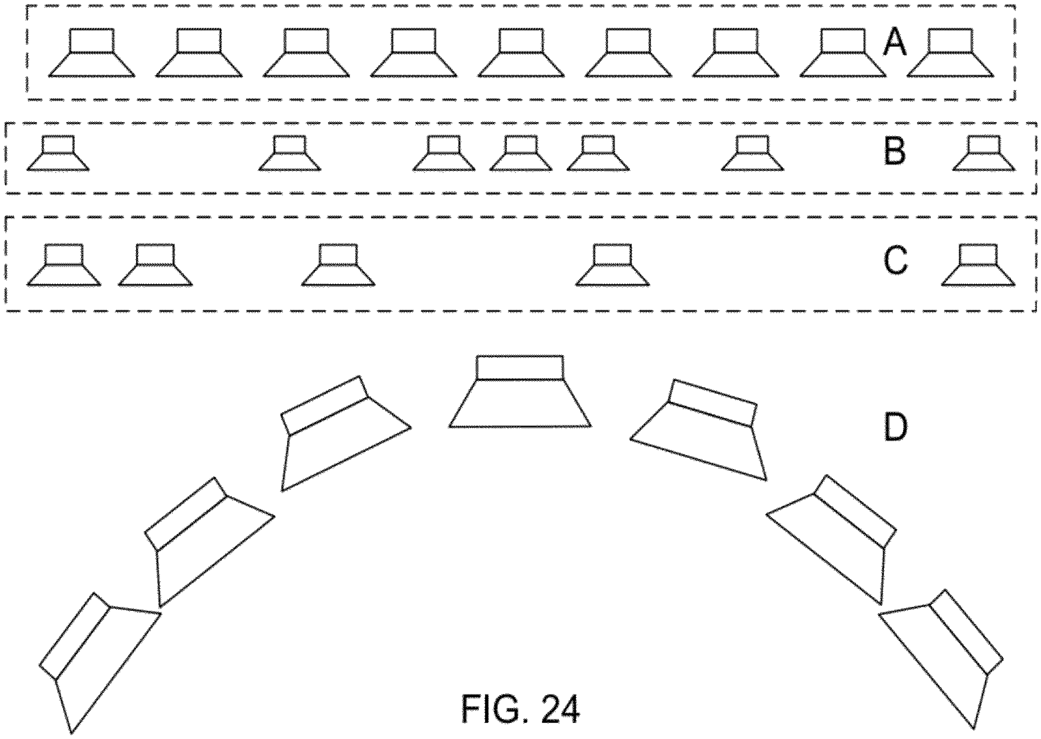
FIGS. 24A-24D show examples of loudspeaker arrays.

It is expressly noted that the principles described herein are not limited to use with a uniform linear array (e.g., as shown in FIG. 24A). For example, a combination of acoustic imaging with PBE (and/or with subarrays and/or tapering as described below) may also be used with a linear array having a nonuniform spacing between adjacent loudspeakers. FIG. 24B shows one example of such an array having symmetrical octave spacing between the loudspeakers, and FIG. 24C shows another example of such an array having asymmetrical octave spacing. Additionally, such principles are not limited to use with linear arrays and may also be used with arrays whose elements are arranged along a simple curve, whether with uniform spacing (e.g., as shown in FIG. 24D) or with nonuniform (e.g., octave) spacing. The same principles stated herein also apply separably to each array in applications having multiple arrays along the same or different (e.g., orthogonal) straight or curved axes, as shown for example in FIG. 18.

Figure 38:
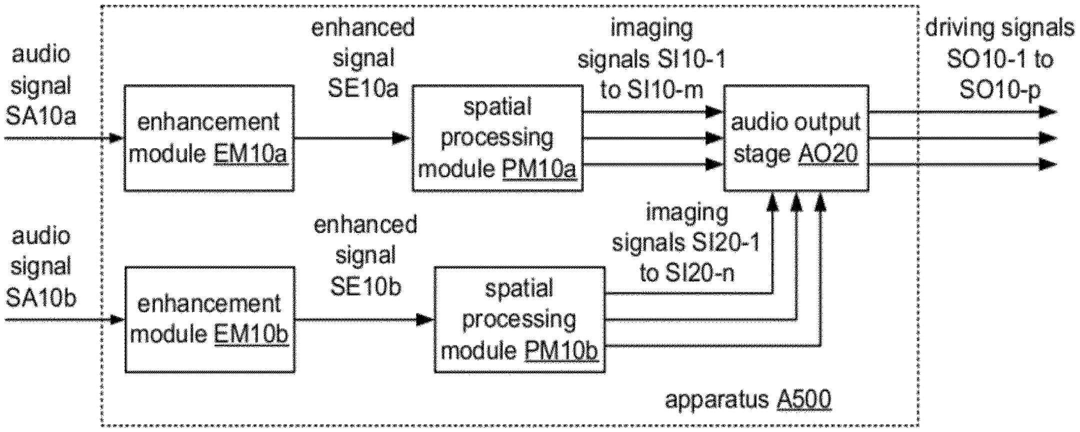
FIG. 38 shows a block diagram of an implementation A500 of apparatus A100.

It is expressly noted that the principles described herein may be extended to multiple monophonic sources driving the same array or arrays via respective instances of beamforming, enhancement, and/or tapering operations to produce multiple sets of driving signals that are summed to drive each loudspeaker. In one example, a separate instance of a path including a PBE operation, beamformer, and highpass filter (e.g., as shown in FIG. 13B) is implemented for each source signal, according to the directional and/or enhancement criteria for the particular source, to produce a respective driving signal for each loudspeaker that is then summed with the driving signals that correspond to the other sources for that loudspeaker. In a similar example, a separate instance of a path including enhancement module EM10 and spatial processing module PM10 as shown in FIG. 12A is implemented for each source signal. In a similar example, a separate instance of the PBE, beamforming, and filtering operations shown in FIG. 14 is implemented for each source signal. FIG. 38 shows a block diagram of an implementation A500 of apparatus A100 that supports separate enhancement and imaging of different audio signals SA10*a* and SA10*b*.

Figure 25:
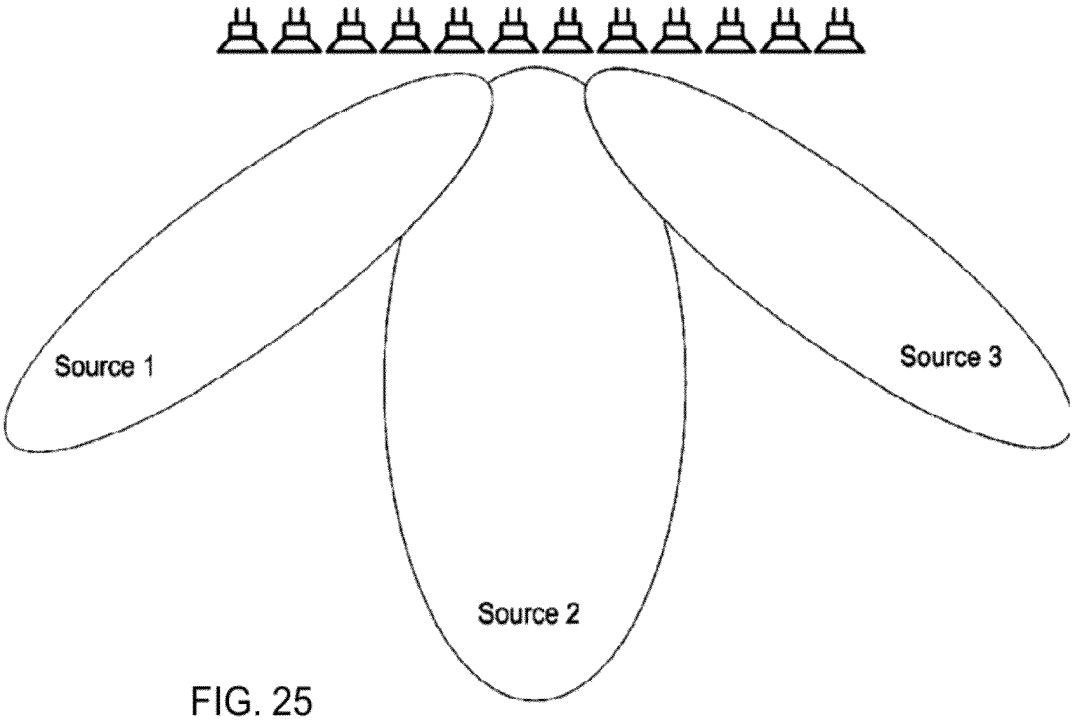
FIG. 25 shows an example in which three source signals are directed in different corresponding directions.

FIG. 25 shows an example in which three source signals are directed in different corresponding directions in such manner. Applications include directing different source signals to users at different locations (possibly in combination with tracking changes in the user's location and adapting the beams to continue to provide the same corresponding signal to each user) and stereo imaging (e.g., by directing, for each channel, a beam to the corresponding one of the user's ear and a null beam to the other ear).

Figure 26:
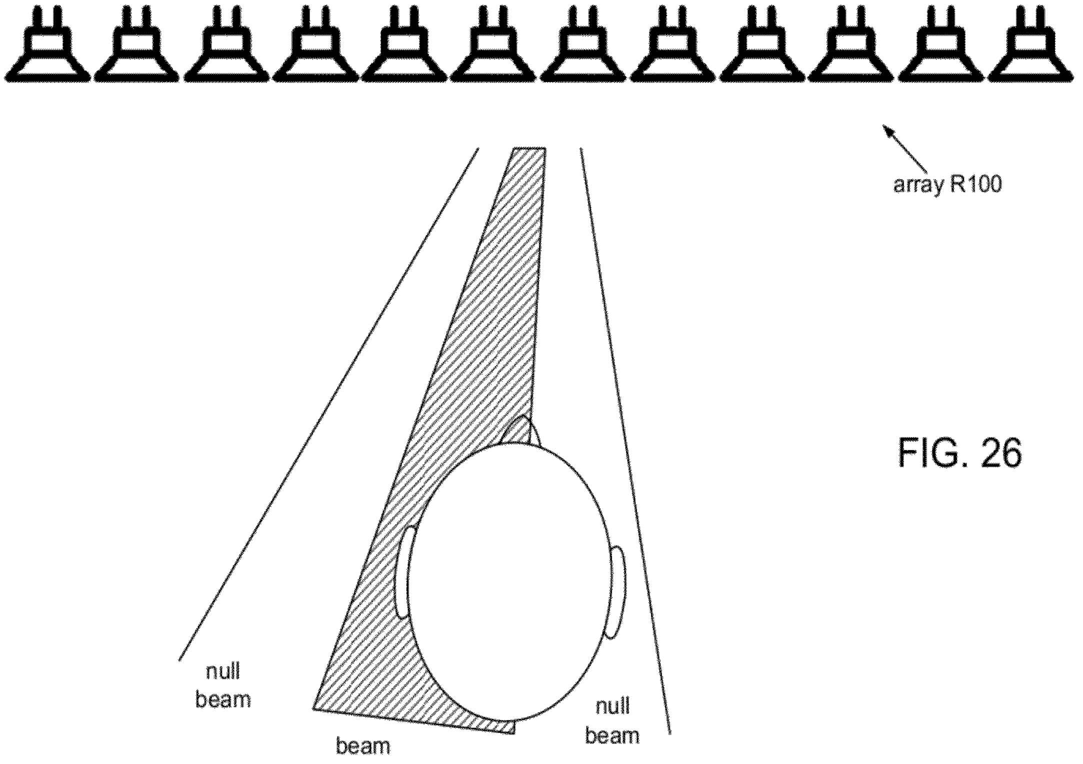
FIG. 26 shows an example in which a beam is directed at the user's left ear and a corresponding null beam is directed at the user's right ear.
Figure 27:
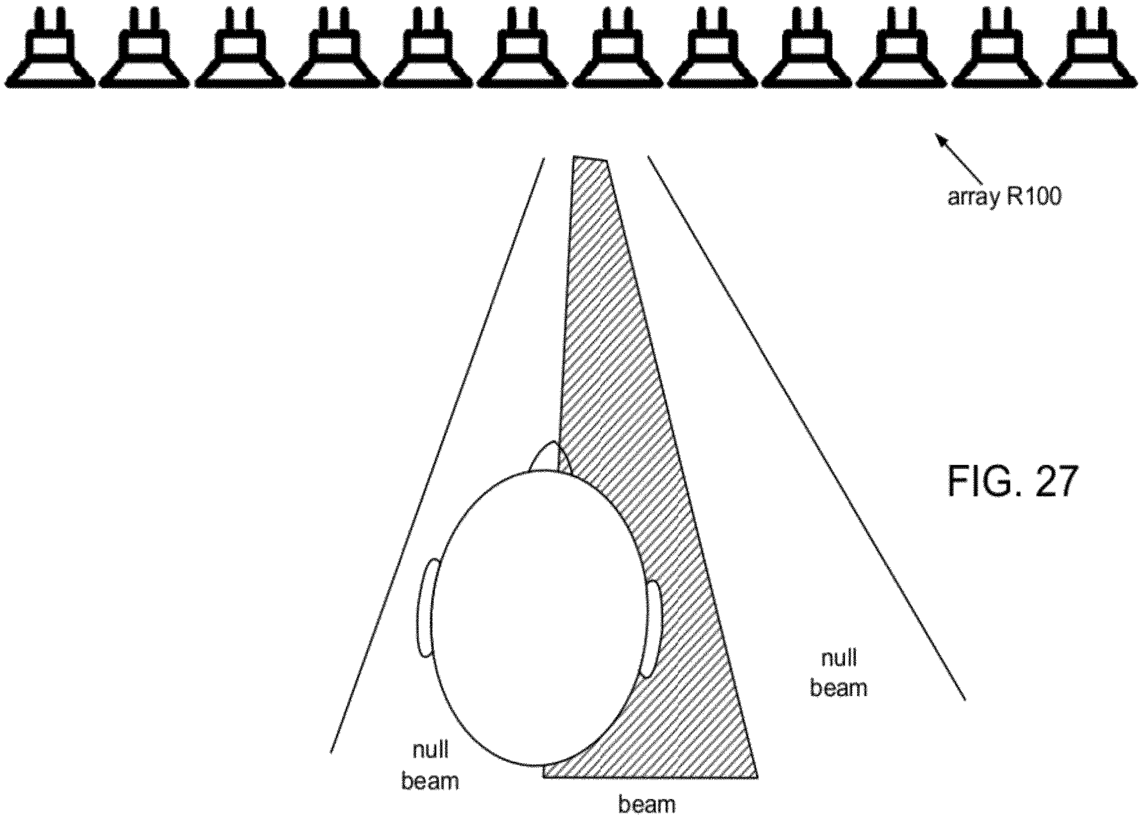
FIG. 27 shows an example in which a beam is directed at the user's right ear and a corresponding null beam is directed at the user's left ear.

FIG. 19 shows one example in which a beam is directed at the user's left ear and a corresponding null beam is directed at the user's right ear. FIG. 26 shows a similar example, and FIG. 27 shows an example in which another source (e.g., the other stereo channel) is directed at the user's right ear (with a corresponding null beam directed at the user's left ear).

Another crosstalk cancellation technique that may be used to deliver a stereo image is to measure, for each loudspeaker of the array, the corresponding head-related transfer function (HRTF) from the loudspeaker to each of the user's ears; to invert that mixing scenario by computing the inverse transfer function matrix; and to configure spatial processing module PM10 to produce the corresponding imaging signals through the inverted matrix.

It may be desirable to provide a user interface such that one or more of lowpass cutoff, highpass cutoff, and/or tapering operations described herein may be adjusted by the end user. Additionally or alternatively, it may be desirable to provide a switch or other interface by which the user may enable or disable a PBE operation as described herein.

Although the various directional processing techniques described above use a far-field model, for a larger array it may be desirable to use a near-field model instead (e.g., such that the sound image is audible only in the near-field). In one such example, the transducers to the left of the array are used to direct a beam across the array to the right, and the transducers to the right of the array are used to direct a beam across the array to the left, such that the beams intersect at a focal point that includes the location of the near-field user. Such an approach may be used in conjunction with masking noise such that the source is not audible in far-field locations (e.g., behind the user and more than one or two meters from the array).

Figure 28:
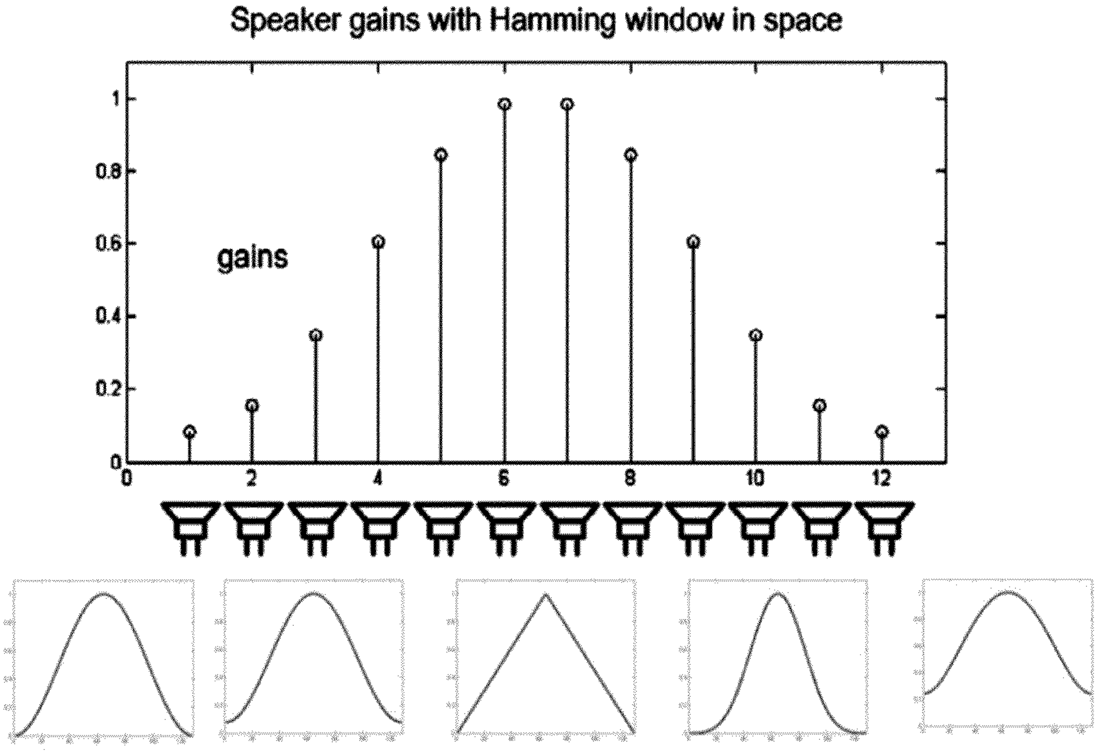
FIG. 28 shows examples of tapering windows.

By manipulating amplitude and/or inter-transducer delay, beam patterns can be generated into specific directions. Since the array has a spatially distributed transducer arrangement, the directional sound image can be further enhanced by reducing the amplitudes of transducers that are located away from the desired direction. Such amplitude control can be implemented by using a spatial shaping function, such as a tapering window that defines different gain factors for different loudspeakers (e.g., as shown in the examples of FIG. 28), to create an amplitude-tapered loudspeaker array. The different types of windows that may be used for amplitude tapering include Hamming, Hanning, triangular, Chebyshev, and Taylor. Other examples of tapering windows include only using transducers to the left, center, or middle of the desired user. Amplitude tapering may also have the effect of enhancing the lateralization of the beam (e.g., translating the beam in a desired direction) and increasing separation between different beams. Such tapering may be performed as part of the beamformer design and/or independently from the beamformer design.

A finite number of loudspeakers introduces a truncation effect, which typically generates sidelobes. It may be desirable to perform shaping in the spatial domain (e.g., windowing) to reduce sidelobes. For example, amplitude tapering may be used to control sidelobes, thereby making a main beam more directional.

Figure 29:
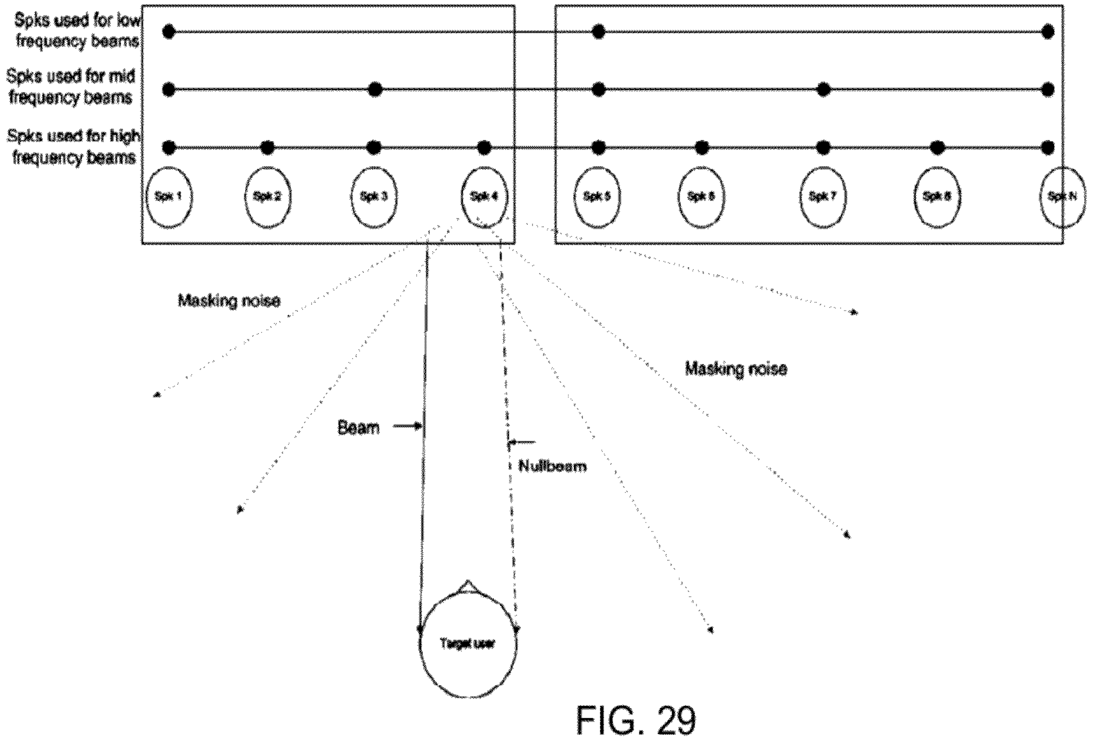
FIGS. 29-31 shows examples of using the left, right, and center transducers to project in corresponding directions, respectively.

FIG. 29 shows an example of using the left transducers to project in directions left of the array center. It may be desirable to taper the amplitudes of the driving signals for the remaining transducers to zero, or to set the amplitudes of all of those driving signals to zero. The examples in FIGS. 29-31 also show subband sampling as described herein.

Figure 30:
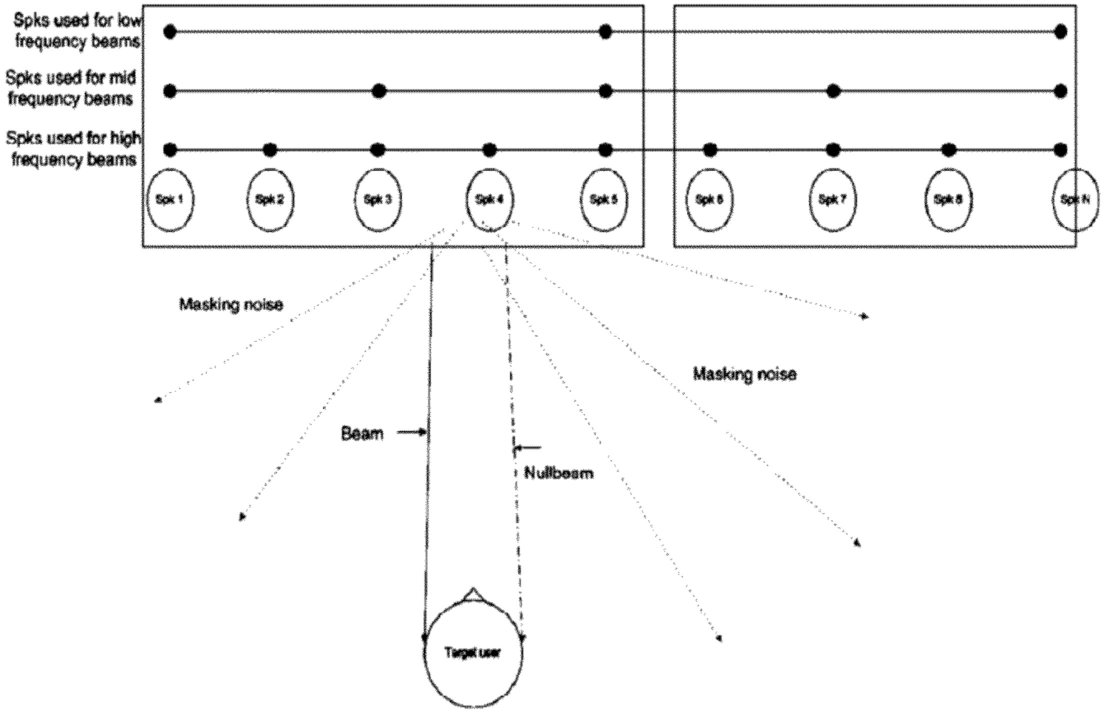

FIG. 30 shows an example of using the right transducers to project in directions right of the array center. It may be desirable to taper the amplitudes of the driving signals for the remaining transducers to zero, or to set the amplitudes of all of those driving signals to zero.

Figure 31:
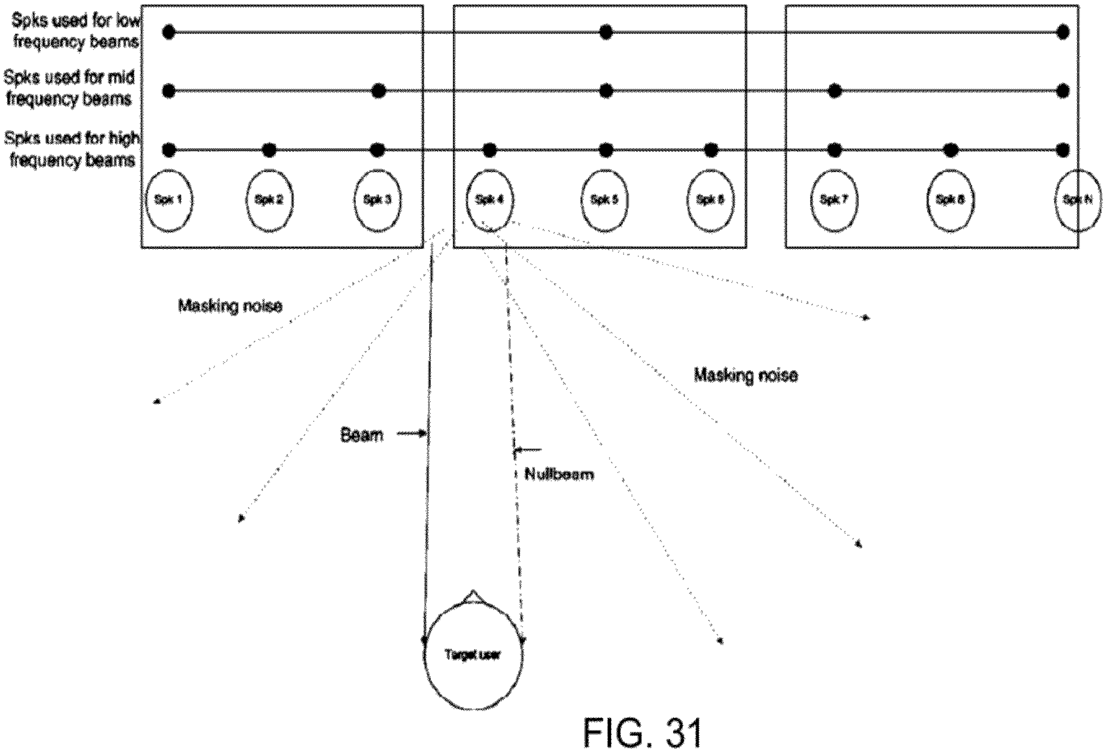

FIG. 31 shows an example of using the middle transducers to project in directions to the middle of the array. It may be desirable to taper the amplitudes of the driving signals for the left and right transducers to zero, or to set the amplitudes of all of those driving signals to zero.

Figure 32A:
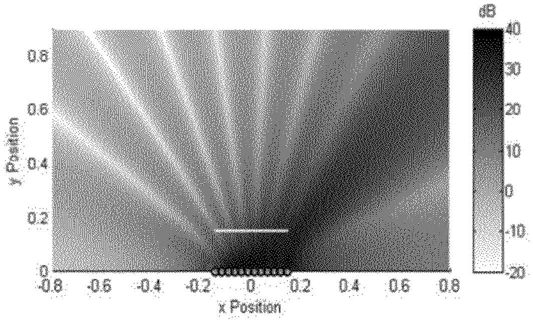
FIGS. 32A-32C demonstrate the influence of tapering on the radiation patterns of a phased-array loudspeaker beamformer.
Figure 32B:
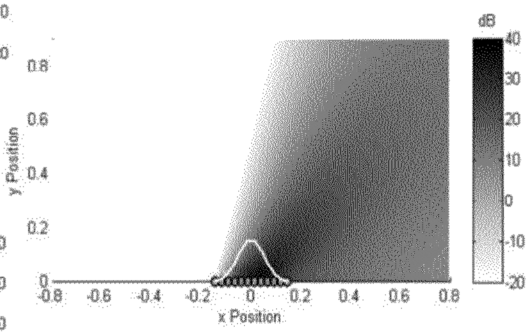
Figure 32C:
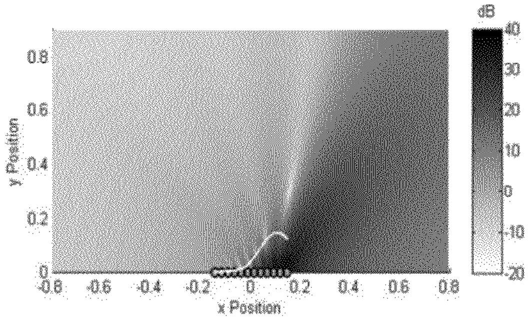

FIGS. 32A-32C demonstrate the influence of tapering on the radiation patterns of a phased-array loudspeaker beamformer for a frequency of 5 kHz, a sampling rate of 48 kHz, and a beam angle of 45 degrees. The white line above the array in each of these figures indicates the relative gains of the loudspeakers across space due to the tapering. FIG. 32A shows the pattern for no tapering. FIG. 32B shows the pattern for tapering with a Chebyshev window, and significant reduction of the pattern on the left side can be seen. FIG. 32C shows the pattern for tapering with another special window for beaming to the right side, and the effect of translating the beam to the right can be seen.

Figure 33:
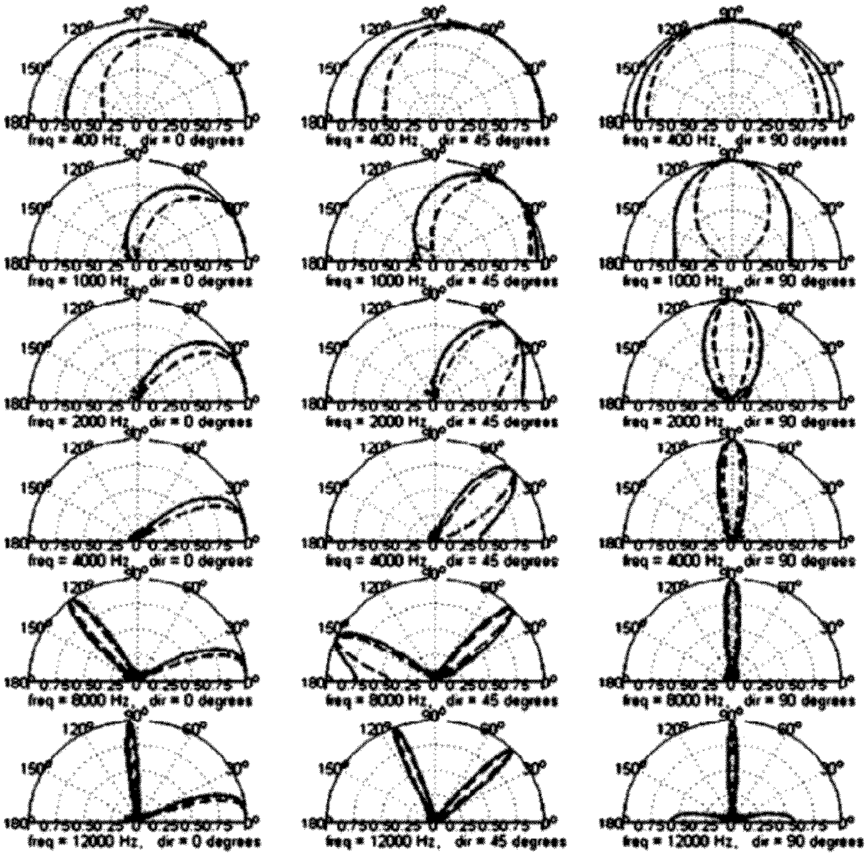
FIG. 33 shows examples of theoretical beam patterns for a phased array.

FIG. 33 shows examples of theoretical beam patterns for a phased array at beam directions of 0 degrees (left column), 45 degrees (center column) and 90 degrees (right column) at six frequencies in the range of from 400 Hz (top row) to 12 kHz (bottom row). The solid lines indicate a linear array of twelve loudspeakers tapered with a Hamming window, and the dashed lines indicate the same array with no tapering.

Figure 34:
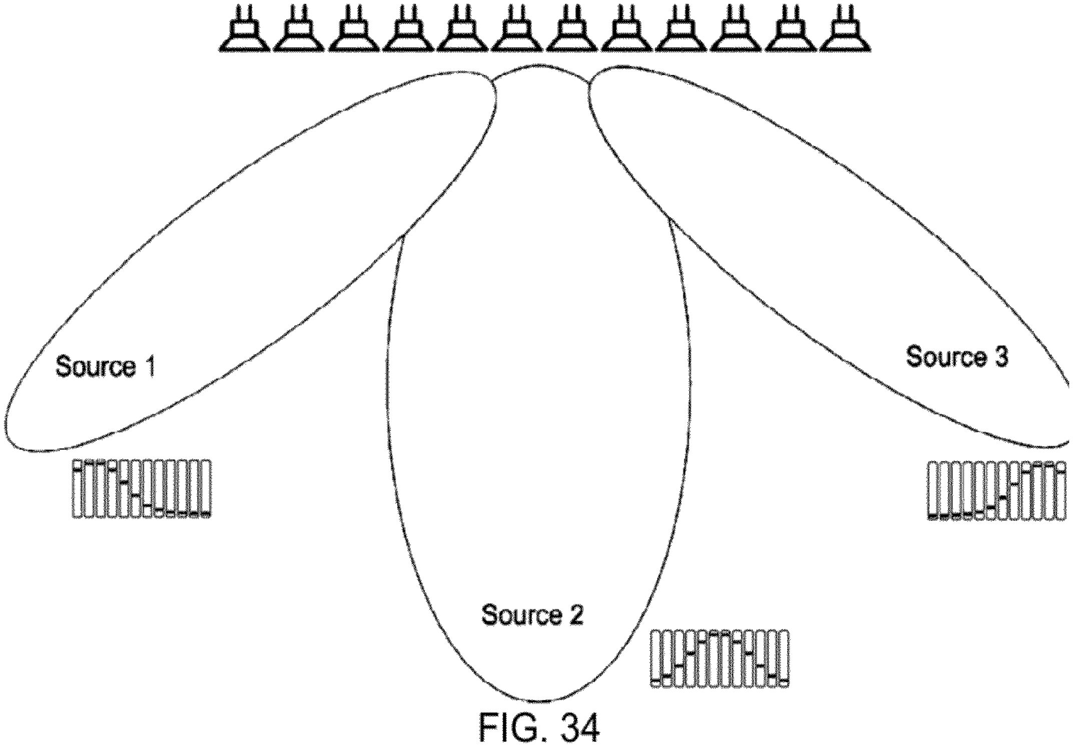
FIG. 34 shows an example in which three source signals are directed in different corresponding directions.

FIG. 34 shows an example of a demonstration design with desired beams for each of three different audio sources. For beams to the side, special tapering curves may be used as shown. A graphical user interface may be used for design and testing of amplitude tapering. A graphical user interface (e.g., a slider-type interface as shown) may also be used to support selection and/or adjustment of amplitude tapering by the end user. In a similar fashion, it may be desirable to implement frequency-dependent tapering, such that the aggressiveness of a lowpass and/or highpass filtering operation may be reduced in a like manner for transducers in a desired direction, relative to the aggressiveness of a corresponding filtering operation for one or more transducers that are located away from the desired direction.

Figure 35:
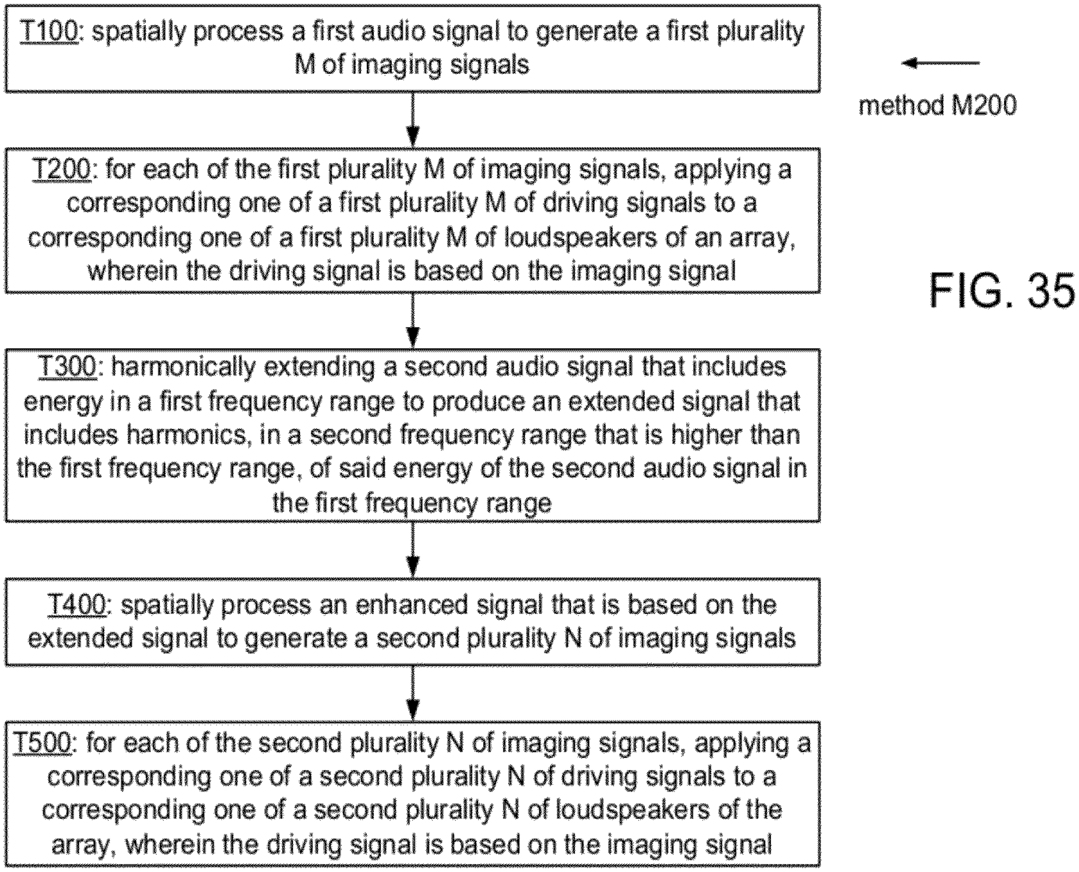
FIG. 35 shows a flowchart of a method M200 according to a general configuration.

FIG. 35 shows a flowchart of a method M200 according to a general configuration that includes tasks T100, T200, T300, T400, and T500. Task T100 spatially processes a first audio signal to generate a first plurality M of imaging signals (e.g., as discussed herein with reference to implementations of spatial processing module PM10). For each of the first plurality M of imaging signals, task T200 applies a corresponding one of a first plurality M of driving signals to a corresponding one of a first plurality M of loudspeakers of an array, wherein the driving signal is based on the imaging signal (e.g., as discussed herein with reference to implementations of audio output stage AO20). Task T300 harmonically extends a second audio signal that includes energy in a first frequency range to produce an extended signal that includes harmonics, in a second frequency range that is higher than the first frequency range, of said energy of the second audio signal in the first frequency range (e.g., as described herein with reference to implementations of enhancement module EM10). Task T400 spatially processes an enhanced signal that is based on the extended signal to generate a second plurality N of imaging signals (e.g., as discussed herein with reference to implementations of spatial processing module PM10). For each of the second plurality N of imaging signals, task T500 applies a corresponding one of a second plurality N of driving signals to a corresponding one of a second plurality N of loudspeakers of an array, wherein the driving signal is based on the imaging signal (e.g., as discussed herein with reference to implementations of audio output stage AO20).

Figure 36:
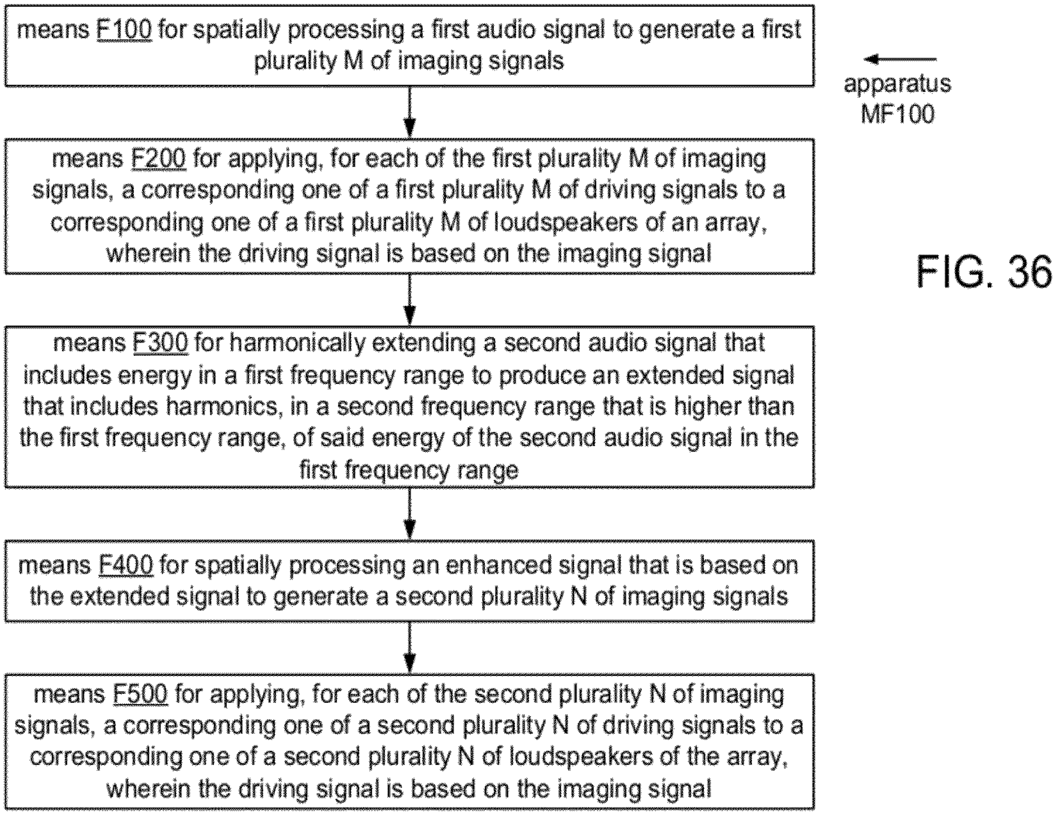
FIG. 36 shows a block diagram of an apparatus MF100 according to a general configuration.

FIG. 36 shows a block diagram of an apparatus MF200 according to a general configuration. Apparatus MF200 includes means F100 for spatially processing a first audio signal to generate a first plurality M of imaging signals (e.g., as discussed herein with reference to implementations of spatial processing module PM10). Apparatus MF200 also includes means F200 for applying, for each of the first plurality M of imaging signals, a corresponding one of a first plurality M of driving signals to a corresponding one of a first plurality M of loudspeakers of an array, wherein the driving signal is based on the imaging signal (e.g., as discussed herein with reference to implementations of audio output stage AO20). Apparatus MF200 also includes means F300 for harmonically extending a second audio signal that includes energy in a first frequency range to produce an extended signal that includes harmonics, in a second frequency range that is higher than the first frequency range, of said energy of the second audio signal in the first frequency range (e.g., as described herein with reference to implementations of enhancement module EM10). Apparatus MF200 also includes means F400 for spatially processing an enhanced signal that is based on the extended signal to generate a second plurality N of imaging signals (e.g., as discussed herein with reference to implementations of spatial processing module PM10). Apparatus MF200 also includes means F500 for applying, for each of the second plurality N of imaging signals, a corresponding one of a second plurality N of driving signals to a corresponding one of a second plurality N of loudspeakers of an array, wherein the driving signal is based on the imaging signal (e.g., as discussed herein with reference to implementations of audio output stage AO20).

The methods and apparatus disclosed herein may be applied generally in any transceiving and/or audio sensing application, especially mobile or otherwise portable instances of such applications. For example, the range of configurations disclosed herein includes communications devices that reside in a wireless telephony communication system configured to employ a code-division multiple-access (CDMA) over-the-air interface. Nevertheless, it would be understood by those skilled in the art that a method and apparatus having features as described herein may reside in any of the various communication systems employing a wide range of technologies known to those of skill in the art, such as systems employing Voice over IP (VoIP) over wired and/or wireless (e.g., CDMA, TDMA, FDMA, and/or TD-SCDMA) transmission channels.

It is expressly contemplated and hereby disclosed that communications devices disclosed herein may be adapted for use in networks that are packet-switched (for example, wired and/or wireless networks arranged to carry audio transmissions according to protocols such as VoIP) and/or circuit-switched. It is also expressly contemplated and hereby disclosed that communications devices disclosed herein may be adapted for use in narrowband coding systems (e.g., systems that encode an audio frequency range of about four or five kilohertz) and/or for use in wideband coding systems (e.g., systems that encode audio frequencies greater than five kilohertz), including whole-band wideband coding systems and split-band wideband coding systems.

The presentation of the described configurations is provided to enable any person skilled in the art to make or use the methods and other structures disclosed herein. The flowcharts, block diagrams, and other structures shown and described herein are examples only, and other variants of these structures are also within the scope of the disclosure. Various modifications to these configurations are possible, and the generic principles presented herein may be applied to other configurations as well. Thus, the present disclosure is not intended to be limited to the configurations shown above but rather is to be accorded the widest scope consistent with the principles and novel features disclosed in any fashion herein, including in the attached claims as filed, which form a part of the original disclosure.

Those of skill in the art will understand that information and signals may be represented using any of a variety of different technologies and techniques. For example, data, instructions, commands, information, signals, bits, and symbols that may be referenced throughout this description may be represented by voltages, currents, electromagnetic waves, magnetic fields or particles, optical fields or particles, or any combination thereof.

Important design requirements for implementation of a configuration as disclosed herein may include minimizing processing delay and/or computational complexity (typically measured in millions of instructions per second or MIPS), especially for computation-intensive applications, such as playback of compressed audio or audiovisual information (e.g., a file or stream encoded according to a compression format, such as one of the examples identified herein) or applications for wideband communications (e.g., voice communications at sampling rates higher than eight kilohertz, such as 12, 16, 44.1, 48, or 192 kHz).

Goals of a multi-microphone processing system as described herein may include achieving ten to twelve dB in overall noise reduction, preserving voice level and color during movement of a desired speaker, obtaining a perception that the noise has been moved into the background instead of an aggressive noise removal, dereverberation of speech, and/or enabling the option of post-processing (e.g., masking and/or noise reduction) for more aggressive noise reduction.

The various elements of an implementation of an apparatus as disclosed herein (e.g., apparatus A100) may be embodied in any hardware structure, or any combination of hardware with software and/or firmware, that is deemed suitable for the intended application. For example, such elements may be fabricated as electronic and/or optical devices residing, for example, on the same chip or among two or more chips in a chipset. One example of such a device is a fixed or programmable array of logic elements, such as transistors or logic gates, and any of these elements may be implemented as one or more such arrays. Any two or more, or even all, of these elements may be implemented within the same array or arrays. Such an array or arrays may be implemented within one or more chips (for example, within a chipset including two or more chips).

One or more elements of the various implementations of the apparatus disclosed herein (e.g., apparatus A100) may also be implemented in part as one or more sets of instructions arranged to execute on one or more fixed or programmable arrays of logic elements, such as microprocessors, embedded processors, IP cores, digital signal processors, FPGAs (field-programmable gate arrays), ASSPs (application-specific standard products), and ASICs (application-specific integrated circuits). Any of the various elements of an implementation of an apparatus as disclosed herein may also be embodied as one or more computers (e.g., machines including one or more arrays programmed to execute one or more sets or sequences of instructions, also called "processors"), and any two or more, or even all, of these elements may be implemented within the same such computer or computers.

A processor or other means for processing as disclosed herein may be fabricated as one or more electronic and/or optical devices residing, for example, on the same chip or among two or more chips in a chipset. One example of such a device is a fixed or programmable array of logic elements, such as transistors or logic gates, and any of these elements may be implemented as one or more such arrays. Such an array or arrays may be implemented within one or more chips (for example, within a chipset including two or more chips). Examples of such arrays include fixed or programmable arrays of logic elements, such as microprocessors, embedded processors, IP cores, DSPs, FPGAs, ASSPs, and ASICs. A processor or other means for processing as disclosed herein may also be embodied as one or more computers (e.g., machines including one or more arrays programmed to execute one or more sets or sequences of instructions) or other processors. It is possible for a processor as described herein to be used to perform tasks or execute other sets of instructions that are not directly related to a procedure of an implementation of method M100, such as a task relating to another operation of a device or system in which the processor is embedded (e.g., an audio sensing device). It is also possible for part of a method as disclosed herein to be performed by a processor of the audio sensing device and for another part of the method to be performed under the control of one or more other processors.

Those of skill will appreciate that the various illustrative modules, logical blocks, circuits, and tests and other operations described in connection with the configurations disclosed herein may be implemented as electronic hardware, computer software, or combinations of both. Such modules, logical blocks, circuits, and operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), nonvolatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

It is noted that the various methods disclosed herein (e.g., method M100, and the various methods disclosed with reference to operation of the various described apparatus) may be performed by an array of logic elements such as a processor, and that the various elements of an apparatus as described herein may be implemented in part as modules designed to execute on such an array. As used herein, the term "module" or "sub-module" can refer to any method, apparatus, device, unit or computer-readable data storage medium that includes computer instructions (e.g., logical expressions) in software, hardware or firmware form. It is to be understood that multiple modules or systems can be combined into one module or system and one module or system can be separated into multiple modules or systems to perform the same functions. When implemented in software or other computer-executable instructions, the elements of a process are essentially the code segments to perform the related tasks, such as with routines, programs, objects, components, data structures, and the like. The term "software" should be understood to include source code, assembly language code, machine code, binary code, firmware, macrocode, microcode, any one or more sets or sequences of instructions executable by an array of logic elements, and any combination of such examples. The program or code segments can be stored in a processor-readable storage medium or transmitted by a computer data signal embodied in a carrier wave over a transmission medium or communication link.

The implementations of methods, schemes, and techniques disclosed herein may also be tangibly embodied (for example, in tangible, computer-readable features of one or more computer-readable storage media as listed herein) as one or more sets of instructions executable by a machine including an array of logic elements (e.g., a processor, microprocessor, microcontroller, or other finite state machine). The term "computer-readable medium" may include any medium that can store or transfer information, including volatile, nonvolatile, removable, and non-removable storage media. Examples of a computer-readable medium include an electronic circuit, a semiconductor memory device, a ROM, a flash memory, an erasable ROM (EROM), a floppy diskette or other magnetic storage, a CD-ROM/DVD or other optical storage, a hard disk or any other medium which can be used to store the desired information, a fiber optic medium, a radio frequency (RF) link, or any other medium which can be used to carry the desired information and can be accessed. The computer data signal may include any signal that can propagate over a transmission medium such as electronic network channels, optical fibers, air, electromagnetic, RF links, etc. The code segments may be downloaded via computer networks such as the Internet or an intranet. In any case, the scope of the present disclosure should not be construed as limited by such embodiments.

Each of the tasks of the methods described herein may be embodied directly in hardware, in a software module executed by a processor, or in a combination of the two. In a typical application of an implementation of a method as disclosed herein, an array of logic elements (e.g., logic gates) is configured to perform one, more than one, or even all of the various tasks of the method. One or more (possibly all) of the tasks may also be implemented as code (e.g., one or more sets of instructions), embodied in a computer program product (e.g., one or more data storage media, such as disks, flash or other nonvolatile memory cards, semiconductor memory chips, etc.), that is readable and/or executable by a machine (e.g., a computer) including an array of logic elements (e.g., a processor, microprocessor, microcontroller, or other finite state machine). The tasks of an implementation of a method as disclosed herein may also be performed by more than one such array or machine. In these or other implementations, the tasks may be performed within a device for wireless communications such as a cellular telephone or other device having such communications capability. Such a device may be configured to communicate with circuit-switched and/or packet-switched networks (e.g., using one or more protocols such as VoIP). For example, such a device may include RF circuitry configured to receive and/or transmit encoded frames.

It is expressly disclosed that the various methods disclosed herein may be performed by a portable communications device (e.g., a handset, headset, smartphone, or portable digital assistant (PDA)), and that the various apparatus described herein may be included within such a device. A typical real-time (e.g., online) application is a telephone conversation conducted using such a mobile device.

In one or more exemplary embodiments, the operations described herein may be implemented in hardware, software, firmware, or any combination thereof. If implemented in software, such operations may be stored on or transmitted over a computer-readable medium as one or more instructions or code. The term "computer-readable media" includes both computer-readable storage media and communication (e.g., transmission) media. By way of example, and not limitation, computer-readable storage media can comprise an array of storage elements, such as semiconductor memory (which may include without limitation dynamic or static RAM, ROM, EEPROM, and/or flash RAM), or ferroelectric, magnetoresistive, ovonic, polymeric, or phase-change memory; CD-ROM or other optical disk storage; and/or magnetic disk storage or other magnetic storage devices. Such storage media may store information in the form of instructions or data structures that can be accessed by a computer. Communication media can comprise any medium that can be used to carry desired program code in the form of instructions or data structures and that can be accessed by a computer, including any medium that facilitates transfer of a computer program from one place to another. Also, any connection is properly termed a computer-readable medium. For example, if the software is transmitted from a website, server, or other remote source using a coaxial cable, fiber optic cable, twisted pair, digital subscriber line (DSL), or wireless technology such as infrared, radio, and/or microwave, then the coaxial cable, fiber optic cable, twisted pair, DSL, or wireless technology such as infrared, radio, and/or microwave are included in the definition of medium. Disk and disc, as used herein, includes compact disc (CD), laser disc, optical disc, digital versatile disc (DVD), floppy disk and Blu-ray Disc™ (Blu-Ray Disc Association, Universal City, Calif.), where disks usually reproduce data magnetically, while discs reproduce data optically with lasers. Combinations of the above should also be included within the scope of computer-readable media.

An acoustic signal processing apparatus as described herein may be incorporated into an electronic device that accepts speech input in order to control certain operations, or may otherwise benefit from separation of desired noises from background noises, such as communications devices. Many applications may benefit from enhancing or separating clear desired sound from background sounds originating from multiple directions. Such applications may include human-machine interfaces in electronic or computing devices which incorporate capabilities such as voice recognition and detection, speech enhancement and separation, voice-activated control, and the like. It may be desirable to implement such an acoustic signal processing apparatus to be suitable in devices that only provide limited processing capabilities.

The elements of the various implementations of the modules, elements, and devices described herein may be fabricated as electronic and/or optical devices residing, for example, on the same chip or among two or more chips in a chipset. One example of such a device is a fixed or programmable array of logic elements, such as transistors or gates. One or more elements of the various implementations of the apparatus described herein may also be implemented in whole or in part as one or more sets of instructions arranged to execute on one or more fixed or programmable arrays of logic elements such as microprocessors, embedded processors, IP cores, digital signal processors, FPGAs, ASSPs, and ASICs.

It is possible for one or more elements of an implementation of an apparatus as described herein to be used to perform tasks or execute other sets of instructions that are not directly related to an operation of the apparatus, such as a task relating to another operation of a device or system in which the apparatus is embedded. It is also possible for one or more elements of an implementation of such an apparatus to have structure in common (e.g., a processor used to execute portions of code corresponding to different elements at different times, a set of instructions executed to perform tasks corresponding to different elements at different times, or an arrangement of electronic and/or optical devices performing operations for different elements at different times).

What is claimed is:

1. A method of audio signal processing, said method comprising:

spatially processing a first audio signal to generate a first plurality M of imaging signals;

for each of the first plurality M of imaging signals, applying a corresponding one of a first plurality M of driving signals to a corresponding one of a first plurality M of loudspeakers of a first array, wherein the driving signal is based on the imaging signal;

harmonically extending a second audio signal that includes energy in a first frequency range to produce an extended signal that includes harmonics, in a second frequency range that is higher than the first frequency range, of said energy of the second audio signal in the first frequency range;

spatially processing an enhanced signal that is based on the extended signal to generate a second plurality N of imaging signals; and for each of the second plurality N of imaging signals, applying a corresponding one of a second plurality N of driving signals to a corresponding one of a second plurality N of loudspeakers of the first array, wherein the driving signal is based on the imaging signal, and wherein a distance between adjacent ones of the first plurality M of loudspeakers is less than a distance between adjacent ones of the second plurality N of loudspeakers.

2. A method of audio signal processing according to claim 1, wherein the first plurality M of driving signals includes the second plurality N of driving signals.

3. A method of audio signal processing according to claim 1, wherein both of the first audio signal and the second audio signal are based on a common audio signal.

4. A method of audio signal processing according to claim 1, wherein said applying the second plurality N of driving signals to the second plurality N of loudspeakers comprises creating a beam of acoustic energy that is more concentrated along a first direction than along a second direction that is different than the first direction, and wherein said method comprises, during said applying the second plurality N of driving signals to the second plurality N of loudspeakers, driving the second plurality N of loudspeakers to create a beam of acoustic noise energy that is more concentrated along the second direction than along the first direction, wherein the first and second directions are relative to the second plurality N of loudspeakers.

5. A method of audio signal processing according to claim 1, wherein said applying the second plurality N of driving signals to the second plurality N of loudspeakers comprises creating a first beam of acoustic energy that is more concentrated along a first direction than along a second direction that is different than the first direction, and wherein said method comprises, during said applying the second plurality N of driving signals to the second plurality N of loudspeakers, applying a third plurality N of driving signals to the second plurality N of loudspeakers to create a second beam of acoustic energy that is more concentrated along the second direction than along the first direction, wherein the first and second directions are relative to the second plurality N of loudspeakers, and wherein each of the third plurality N of driving signals is based on an additional audio signal that is different than the second audio signal.

6. A method of audio signal processing according to claim 5, wherein the second audio signal and the additional audio signal are different channels of a stereophonic audio signal.

7. A method of audio signal processing according to claim 1, wherein said method comprises determining that an orientation of a head of a user at a first time is within a first range, and wherein said applying the first plurality M of driving signals to the first plurality M of loudspeakers and said applying the second plurality N of driving signals to the second plurality N of loudspeakers are based on said determining at the first time, and wherein said method comprises:

determining that an orientation of the head of the user at a second time subsequent to the first time is within a second range that is different than the first range;

in response to said determining at the second time, applying the first plurality M of driving signals to a first plurality M of loudspeakers of a second array and applying the second plurality N of driving signals to a second plurality N of loudspeakers of the second array, wherein at least one of the first plurality M of loudspeakers of the second array is not among the first plurality M of loudspeakers of the first array, and wherein at least one of the second plurality N of loudspeakers of the second array is not among the second plurality N of loudspeakers of the first array.

8. A method of audio signal processing according to claim 7, wherein the first plurality M of loudspeakers of the first array are arranged along a first axis, and wherein the first plurality M of loudspeakers of the second array are arranged along a second axis, and wherein an angle between the first and second axes is at least sixty degrees and not more than one hundred twenty degrees.

9. A method of audio signal processing according to claim 1, wherein said method comprises applying a spatial shaping function to the first plurality M of imaging signals, and wherein said spatial shaping function maps a position of each among at least a subset of the first plurality M of loudspeakers within the first array to a corresponding gain factor, and wherein said applying the spatial shaping function comprises varying an amplitude of each among the subset of the first plurality M of imaging signals according to the corresponding gain factor.

10. A method of audio signal processing according to claim 1, wherein a ratio of energy in the first frequency range to energy in the second frequency range is at least six decibels lower for each of the second plurality N of driving signals than for the extended signal.

11. A method of audio signal processing according to claim 1, wherein the second audio signal includes energy in a first high-frequency range that is higher than the second frequency range and energy in a second high-frequency range that is higher than the first high-frequency range, and wherein a ratio of energy in the first high-frequency range to energy in the second high-frequency range is at least six decibels higher for each of the second plurality N of driving signals than for the extended signal.

12. A method of audio signal processing according to claim 1, wherein said method comprises harmonically extending a third audio signal that includes energy in the second frequency range to produce a second extended signal that includes harmonics, in a third frequency range that is higher than the second frequency range, of said energy of the third audio signal in the second frequency range, and wherein the first audio signal is based on the second extended signal.

13. A method of audio signal processing according to claim 12, wherein a ratio of energy in the first frequency range to energy in the second frequency range is at least six decibels lower for each of the second plurality N of driving signals than for the extended signal, and wherein a ratio of energy in the second frequency range to energy in the third frequency range is at least six decibels lower for each of the first plurality M of driving signals than for the second extended signal.

14. A method of audio signal processing according to claim 13, wherein a ratio of energy in the first frequency range to energy in the third frequency range is at least six decibels lower for each of the first plurality M of driving signals than for the second extended signal.

15. A method of audio signal processing according to claim 12, wherein the second audio signal includes energy in a first high-frequency range that is higher than the third frequency range and energy in a second high-frequency range that is higher than the first high-frequency range, and wherein a ratio of energy in the first high-frequency range to energy in the second high-frequency range is at least six decibels higher for each of the second plurality N of driving signals than for the extended signal, and wherein the third audio signal includes energy in the second high-frequency range and energy in a third high-frequency range that is higher than the second high-frequency range, and wherein a ratio of energy in the second high-frequency range to energy in the third high-frequency range is at least six decibels higher for each of the first plurality M of driving signals than for the second extended signal.

16. A method of audio signal processing according to claim 12, wherein both of the second audio signal and the third audio signal are based on a common audio signal.

17. An apparatus for audio signal processing, said apparatus comprising:

means for spatially processing a first audio signal to generate a first plurality M of imaging signals;

means for applying, for each of the first plurality M of imaging signals, a corresponding one of a first plurality M of driving signals to a corresponding one of a first plurality M of loudspeakers of a first array, wherein the driving signal is based on the imaging signal;

means for harmonically extending a second audio signal that includes energy in a first frequency range to produce an extended signal that includes harmonics, in a second frequency range that is higher than the first frequency range, of said energy of the second audio signal in the first frequency range;

means for spatially processing an enhanced signal that is based on the extended signal to generate a second plurality N of imaging signals; and means for applying, for each of the second plurality N of imaging signals, a corresponding one of a second plurality N of driving signals to a corresponding one of a second plurality N of loudspeakers of the first array, wherein the driving signal is based on the imaging signal, and wherein a distance between adjacent ones of the first plurality M of loudspeakers is less than a distance between adjacent ones of the second plurality N of loudspeakers.

18. An apparatus for audio signal processing according to claim 17, wherein the first plurality M of driving signals includes the second plurality N of driving signals.

19. An apparatus for audio signal processing according to claim 17, wherein both of the first audio signal and the second audio signal are based on a common audio signal.

20. An apparatus for audio signal processing according to claim 17, wherein said means for applying the second plurality N of driving signals to the second plurality N of loudspeakers is configured to create a beam of acoustic energy that is more concentrated along a first direction than along a second direction that is different than the first direction, and wherein said apparatus comprises means for driving the second plurality N of loudspeakers, during said applying the second plurality N of driving signals to the second plurality N of loudspeakers, to create a beam of acoustic noise energy that is more concentrated along the second direction than along the first direction, wherein the first and second directions are relative to the second plurality N of loudspeakers.

21. An apparatus for audio signal processing according to claim 17, wherein said means for applying the second plurality N of driving signals to the second plurality N of loudspeakers is configured to create a first beam of acoustic energy that is more concentrated along a first direction than along a second direction that is different than the first direction, and wherein said apparatus comprises means for applying a third plurality N of driving signals to the second plurality N of loudspeakers, during said applying the second plurality N of driving signals to the second plurality N of loudspeakers, to create a second beam of acoustic energy that is more concentrated along the second direction than along the first direction, wherein the first and second directions are relative to the second plurality N of loudspeakers, and wherein each of the third plurality N of driving signals is based on an additional audio signal that is different than the second audio signal.

22. An apparatus for audio signal processing according to claim 21, wherein the second audio signal and the additional audio signal are different channels of a stereophonic audio signal.

23. An apparatus for audio signal processing according to claim 17, wherein said apparatus comprises means for determining that an orientation of a head of a user at a first time is within a first range, and wherein said means for determining at the first time is arranged to enable said means for applying the first plurality M of driving signals to the first plurality M of loudspeakers and said means for applying the second plurality N of driving signals to the second plurality N of loudspeakers, and wherein said apparatus comprises:

means for determining that an orientation of the head of the user at a second time subsequent to the first time is within a second range that is different than the first range;

means for applying the first plurality M of driving signals to a first plurality M of loudspeakers of a second array; and means for applying the second plurality N of driving signals to a second plurality N of loudspeakers of the second array, wherein said means for determining at the second time is arranged to enable said means for applying the first plurality M of driving signals to the first plurality M of loudspeakers of the second array and said means for applying the second plurality N of driving signals to the second plurality N of loudspeakers of the second array, wherein at least one of the first plurality M of loudspeakers of the second array is not among the first plurality M of loudspeakers of the first array, and wherein at least one of the second plurality N of loudspeakers of the second array is not among the second plurality N of loudspeakers of the first array.

24. An apparatus for audio signal processing according to claim 23, wherein the first plurality M of loudspeakers of the first array are arranged along a first axis, and wherein the first plurality M of loudspeakers of the second array are arranged along a second axis, and wherein an angle between the first and second axes is at least sixty degrees and not more than one hundred twenty degrees.

25. An apparatus for audio signal processing according to claim 17, wherein said apparatus comprises means for applying a spatial shaping function to the first plurality M of imaging signals, and wherein said spatial shaping function maps a position of each among at least a subset of the first plurality M of loudspeakers within the first array to a corresponding gain factor, and wherein said means for applying the spatial shaping function comprises means for varying an amplitude of each among the subset of the first plurality M of imaging signals according to the corresponding gain factor.

26. An apparatus for audio signal processing according to claim 17, wherein a ratio of energy in the first frequency range to energy in the second frequency range is at least six decibels lower for each of the second plurality N of driving signals than for the extended signal.

27. An apparatus for audio signal processing according to claim 17, wherein the second audio signal includes energy in a first high-frequency range that is higher than the second frequency range and energy in a second high-frequency range that is higher than the first high-frequency range, and wherein a ratio of energy in the first high-frequency range to energy in the second high-frequency range is at least six decibels higher for each of the second plurality N of driving signals than for the extended signal.

28. An apparatus for audio signal processing according to claim 17, wherein said apparatus comprises means for harmonically extending a third audio signal that includes energy in the second frequency range to produce a second extended signal that includes harmonics, in a third frequency range that is higher than the second frequency range, of said energy of the third audio signal in the second frequency range, and wherein the first audio signal is based on the second extended signal.

29. An apparatus for audio signal processing according to claim 28, wherein a ratio of energy in the first frequency range to energy in the second frequency range is at least six decibels lower for each of the second plurality N of driving signals than for the extended signal, and wherein a ratio of energy in the second frequency range to energy in the third frequency range is at least six decibels lower for each of the first plurality M of driving signals than for the second extended signal.

30. An apparatus for audio signal processing according to claim 29, wherein a ratio of energy in the first frequency range to energy in the third frequency range is at least six decibels lower for each of the first plurality M of driving signals than for the second extended signal.

31. An apparatus for audio signal processing according to claim 28, wherein the second audio signal includes energy in a first high-frequency range that is higher than the third frequency range and energy in a second high-frequency range that is higher than the first high-frequency range, and wherein a ratio of energy in the first high-frequency range to energy in the second high-frequency range is at least six decibels higher for each of the second plurality N of driving signals than for the extended signal, and wherein the third audio signal includes energy in the second high-frequency range and energy in a third high-frequency range that is higher than the second high-frequency range, and wherein a ratio of energy in the second high-frequency range to energy in the third high-frequency range is at least six decibels higher for each of the first plurality M of driving signals than for the second extended signal.

32. An apparatus for audio signal processing according to claim 28, wherein both of the second audio signal and the third audio signal are based on a common audio signal.

33. An apparatus for audio signal processing, said apparatus comprising:

a first spatial processing module configured to spatially process a first audio signal to generate a first plurality M of imaging signals;

an audio output stage configured to apply, for each of the first plurality M of imaging signals, a corresponding one of a first plurality M of driving signals to a corresponding one of a first plurality M of loudspeakers of a first array, wherein the driving signal is based on the imaging signal;

a harmonic extension module configured to harmonically extend a second audio signal that includes energy in a first frequency range to produce an extended signal that includes harmonics, in a second frequency range that is higher than the first frequency range, of said energy of the second audio signal in the first frequency range; and a second spatial processing module configured to spatially process an enhanced signal that is based on the extended signal to generate a second plurality N of imaging signals, wherein said audio output stage is configured to apply, for each of the second plurality N of imaging signals, a corresponding one of a second plurality N of driving signals to a corresponding one of a second plurality N of loudspeakers of the first array, wherein the driving signal is based on the imaging signal, and wherein a distance between adjacent ones of the first plurality M of loudspeakers is less than a distance between adjacent ones of the second plurality N of loudspeakers.

34. An apparatus for audio signal processing according to claim 33, wherein the first plurality M of driving signals includes the second plurality N of driving signals.

35. An apparatus for audio signal processing according to claim 33, wherein both of the first audio signal and the second audio signal are based on a common audio signal.

36. An apparatus for audio signal processing according to claim 33, wherein said audio output stage is configured to apply the second plurality N of driving signals to the second plurality N of loudspeakers to create a beam of acoustic energy that is more concentrated along a first direction than along a second direction that is different than the first direction, and wherein said audio output stage is configured to drive the second plurality N of loudspeakers, during said applying the second plurality N of driving signals to the second plurality N of loudspeakers, to create a beam of acoustic noise energy that is more concentrated along the second direction than along the first direction, wherein the first and second directions are relative to the second plurality N of loudspeakers.

37. An apparatus for audio signal processing according to claim 33, wherein said audio output stage is configured to apply the second plurality N of driving signals to the second plurality N of loudspeakers to create a first beam of acoustic energy that is more concentrated along a first direction than along a second direction that is different than the first direction, and wherein said audio output stage is configured to apply a third plurality N of driving signals to the second plurality N of loudspeakers, during said applying the second plurality N of driving signals to the second plurality N of loudspeakers, to create a second beam of acoustic energy that is more concentrated along the second direction than along the first direction, wherein the first and second directions are relative to the second plurality N of loudspeakers, and wherein each of the third plurality N of driving signals is based on an additional audio signal that is different than the second audio signal.

38. An apparatus for audio signal processing according to claim 37, wherein the second audio signal and the additional audio signal are different channels of a stereophonic audio signal.

39. An apparatus for audio signal processing according to claim 33, wherein said apparatus comprises a tracking module configured to determine that an orientation of a head of a user at a first time is within a first range, and wherein said tracking module is arranged to control said audio output stage to apply the first plurality M of driving signals to the first plurality M of loudspeakers and to apply the second plurality N of driving signals to the second plurality N of loudspeakers, in response to said determining at the first time, and wherein said tracking module is configured to determine that an orientation of the head of the user at a second time subsequent to the first time is within a second range that is different than the first range, and wherein said tracking module is arranged to control said audio output stage to apply the first plurality M of driving signals to a first plurality M of loudspeakers of a second array and to apply the second plurality N of driving signals to a second plurality N of loudspeakers of the second array, in response to said determining at the second time, and wherein at least one of the first plurality M of loudspeakers of the second array is not among the first plurality M of loudspeakers of the first array, and wherein at least one of the second plurality N of loudspeakers of the second array is not among the second plurality N of loudspeakers of the first array.

40. An apparatus for audio signal processing according to claim 39, wherein the first plurality M of loudspeakers of the first array are arranged along a first axis, and wherein the first plurality M of loudspeakers of the second array are arranged along a second axis, and wherein an angle between the first and second axes is at least sixty degrees and not more than one hundred twenty degrees.

41. An apparatus for audio signal processing according to claim 33, wherein said apparatus comprises a spatial shaper configured to apply a spatial shaping function to the first plurality M of imaging signals, and wherein said spatial shaping function maps a position of each among at least a subset of the first plurality M of loudspeakers within the first array to a corresponding gain factor, and wherein said spatial shaper is configured to vary an amplitude of each among the subset of the first plurality M of imaging signals according to the corresponding gain factor.

42. An apparatus for audio signal processing according to claim 33, wherein a ratio of energy in the first frequency range to energy in the second frequency range is at least six decibels lower for each of the second plurality N of driving signals than for the extended signal.

43. An apparatus for audio signal processing according to claim 33, wherein the second audio signal includes energy in a first high-frequency range that is higher than the second frequency range and energy in a second high-frequency range that is higher than the first high-frequency range, and wherein a ratio of energy in the first high-frequency range to energy in the second high-frequency range is at least six decibels higher for each of the second plurality N of driving signals than for the extended signal.

44. An apparatus for audio signal processing according to claim 33, wherein said apparatus comprises a second harmonic extension module configured to harmonically extend a third audio signal that includes energy in the second frequency range to produce a second extended signal that includes harmonics, in a third frequency range that is higher than the second frequency range, of said energy of the third audio signal in the second frequency range, and wherein the first audio signal is based on the second extended signal.

45. An apparatus for audio signal processing according to claim 44, wherein a ratio of energy in the first frequency range to energy in the second frequency range is at least six decibels lower for each of the second plurality N of driving signals than for the extended signal, and wherein a ratio of energy in the second frequency range to energy in the third frequency range is at least six decibels lower for each of the first plurality M of driving signals than for the second extended signal.

46. An apparatus for audio signal processing according to claim 45, wherein a ratio of energy in the first frequency range to energy in the third frequency range is at least six decibels lower for each of the first plurality M of driving signals than for the second extended signal.

47. An apparatus for audio signal processing according to claim 44, wherein the second audio signal includes energy in a first high-frequency range that is higher than the third frequency range and energy in a second high-frequency range that is higher than the first high-frequency range, and wherein a ratio of energy in the first high-frequency range to energy in the second high-frequency range is at least six decibels higher for each of the second plurality N of driving signals than for the extended signal, and wherein the third audio signal includes energy in the second high-frequency range and energy in a third high-frequency range that is higher than the second high-frequency range, and wherein a ratio of energy in the second high-frequency range to energy in the third high-frequency range is at least six decibels higher for each of the first plurality M of driving signals than for the second extended signal.

48. An apparatus for audio signal processing according to claim 44, wherein both of the second audio signal and the third audio signal are based on a common audio signal.

49. A non-transitory computer-readable storage medium having tangible features that when read by a machine cause the machine to:

spatially process a first audio signal to generate a first plurality M of imaging signals;

apply, for each of the first plurality M of imaging signals, a corresponding one of a first plurality M of driving signals to a corresponding one of a first plurality M of loudspeakers of a first array, wherein the driving signal is based on the imaging signal;

harmonically extend a second audio signal that includes energy in a first frequency range to produce an extended signal that includes harmonics, in a second frequency range that is higher than the first frequency range, of said energy of the second audio signal in the first frequency range;

spatially process an enhanced signal that is based on the extended signal to generate a second plurality N of imaging signals; and apply, for each of the second plurality N of imaging signals, a corresponding one of a second plurality N of driving signals to a corresponding one of a second plurality N of loudspeakers of the first array, wherein the driving signal is based on the imaging signal, and wherein a distance between adjacent ones of the first plurality M of loudspeakers is less than a distance between adjacent ones of the second plurality N of loudspeakers.

* * * * *